(12) United States Patent
Miyashita

(10) Patent No.: US 11,188,283 B2
(45) Date of Patent: Nov. 30, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Yoshiyuki Miyashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 151 days.

(21) Appl. No.: 16/354,149

(22) Filed: Mar. 14, 2019

(65) Prior Publication Data

US 2019/0294388 A1    Sep. 26, 2019

(30) Foreign Application Priority Data

Mar. 20, 2018 (JP) .............................. JP2018-053425

(51) Int. Cl.
*G06F 3/12* (2006.01)
*G06T 19/00* (2011.01)

(52) U.S. Cl.
CPC ............ *G06F 3/126* (2013.01); *G06F 3/1204* (2013.01); *G06F 3/1207* (2013.01); *G06F 3/1259* (2013.01); *G06T 19/006* (2013.01)

(58) Field of Classification Search
CPC ........ G06T 19/003; G06T 13/40; G06F 3/126
USPC ......................................................... 358/1.15
See application file for complete search history.

(56) References Cited

U.S. PATENT DOCUMENTS

| | | |
|---|---|---|
| 2007/0241884 A1 | 10/2007 | Yamazaki et al. |
| 2009/0138807 A1* | 5/2009 | Fuhrmann ............... H04L 67/38 715/757 |
| 2010/0250612 A1* | 9/2010 | Reuveni .................. G06Q 10/02 707/799 |
| 2011/0066938 A1* | 3/2011 | Nageswaram ....... G06Q 10/107 715/706 |
| 2015/0205894 A1* | 7/2015 | Faris .................. G06Q 30/0207 703/21 |
| 2018/0034867 A1* | 2/2018 | Zahn ..................... H04L 51/046 |

FOREIGN PATENT DOCUMENTS

| | | |
|---|---|---|
| JP | 2002163512 | 6/2002 |
| JP | 2007265032 | 10/2007 |
| JP | 2008134752 | 6/2008 |

* cited by examiner

*Primary Examiner* — Thomas J Lett
(74) *Attorney, Agent, or Firm* — JCIPRNET

(57) ABSTRACT

An information processing apparatus includes an acquisition unit that acquires information on waiting for receiving a specific service; and a display control unit that displays an image of a virtual person, based on the information on waiting, in a case where a real place or apparatus managed in association with the specific service is recognized.

18 Claims, 30 Drawing Sheets

↓ CANCEL

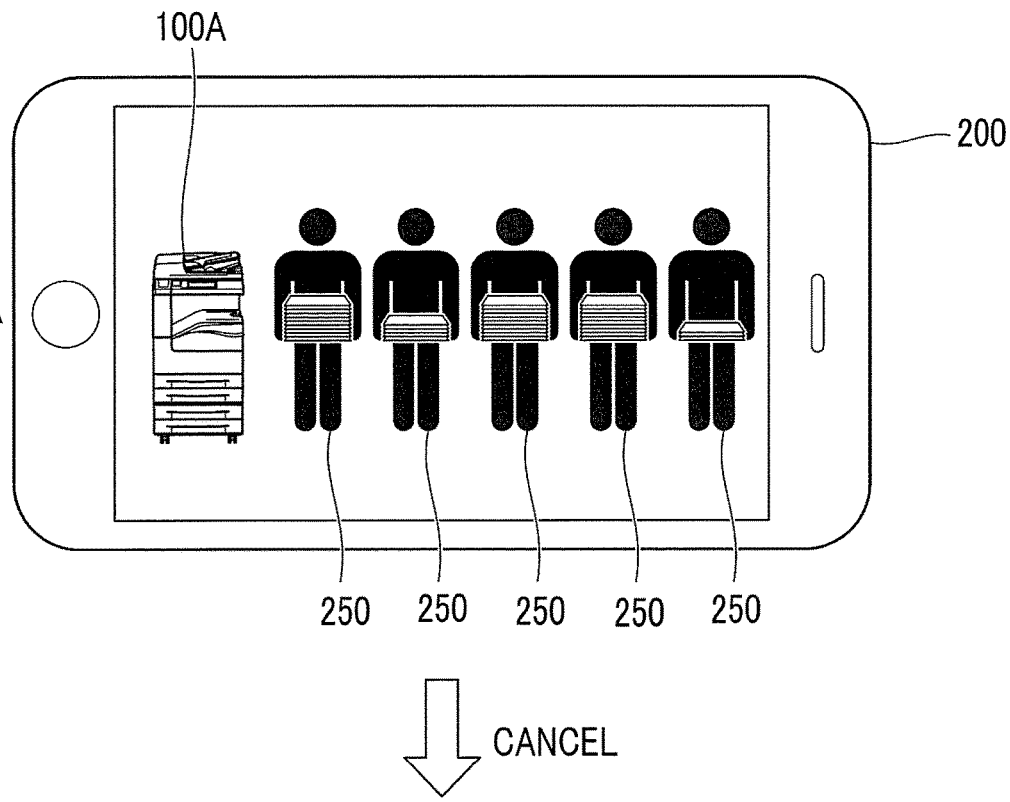
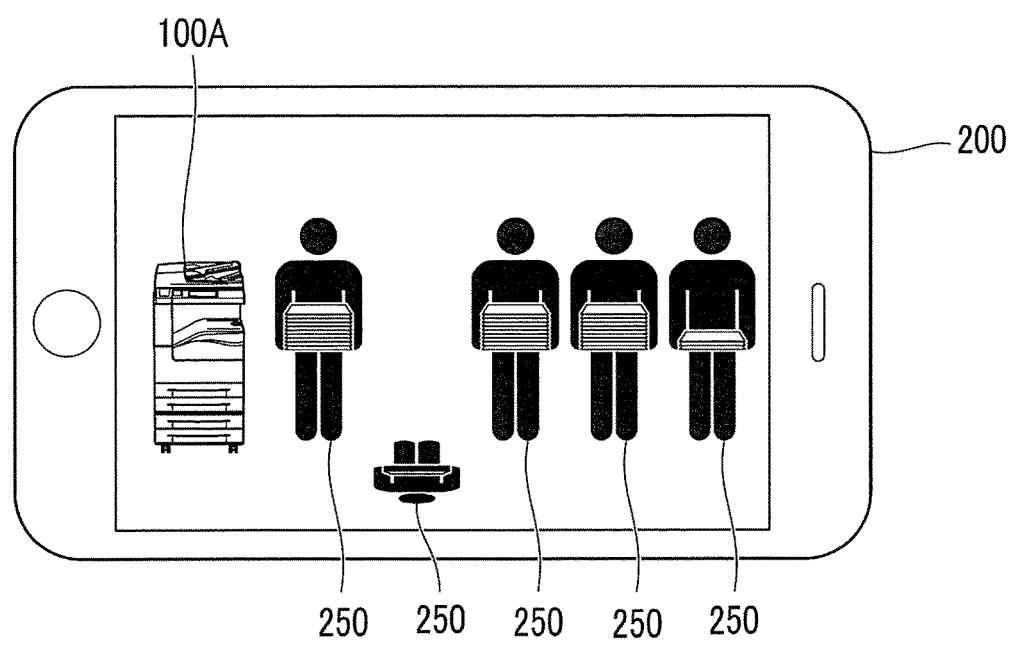

FIG. 23
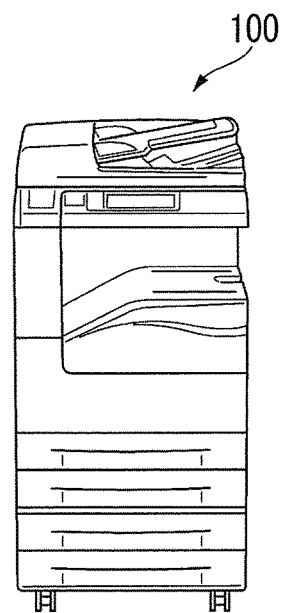
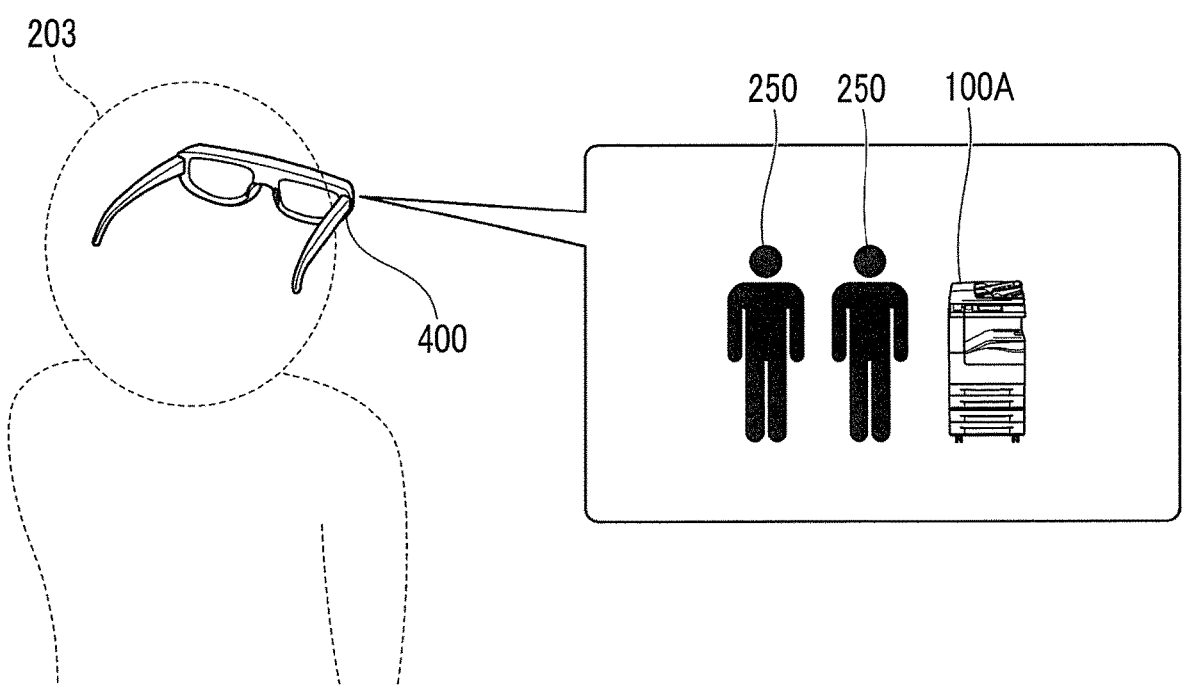

FIG. 27
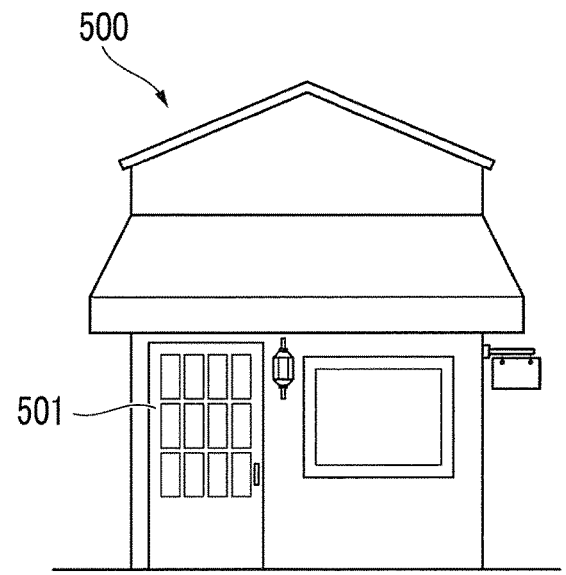
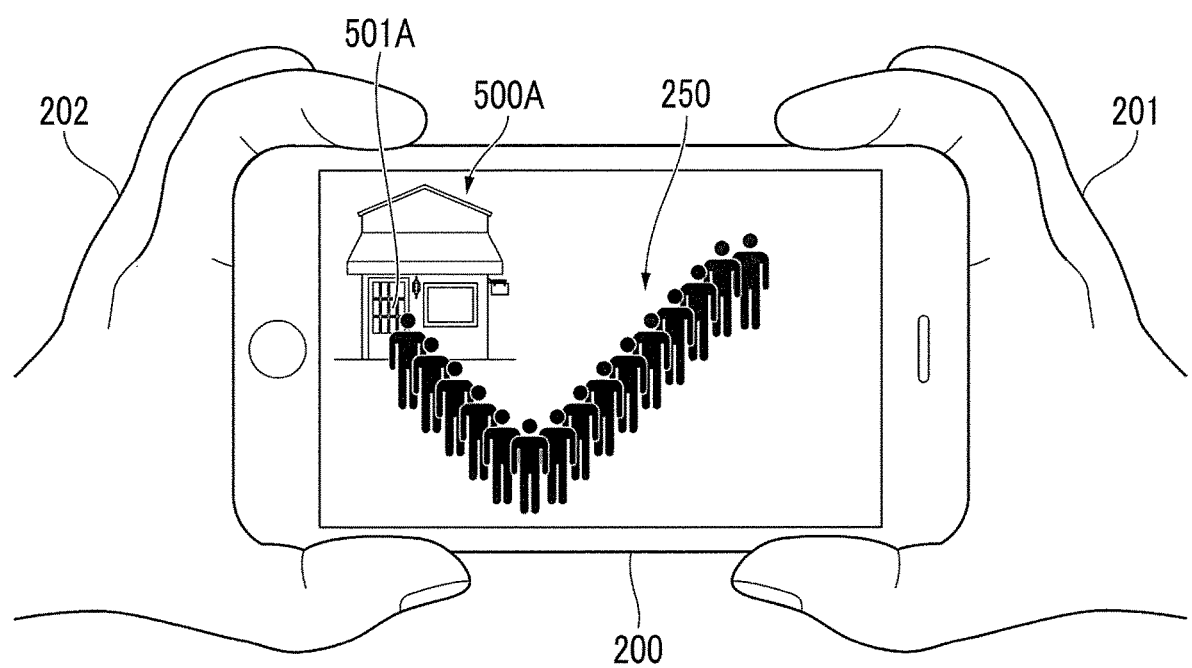

FIG. 28
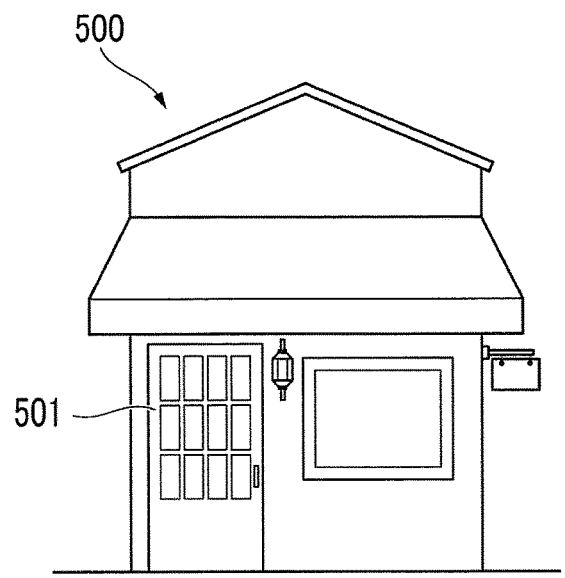
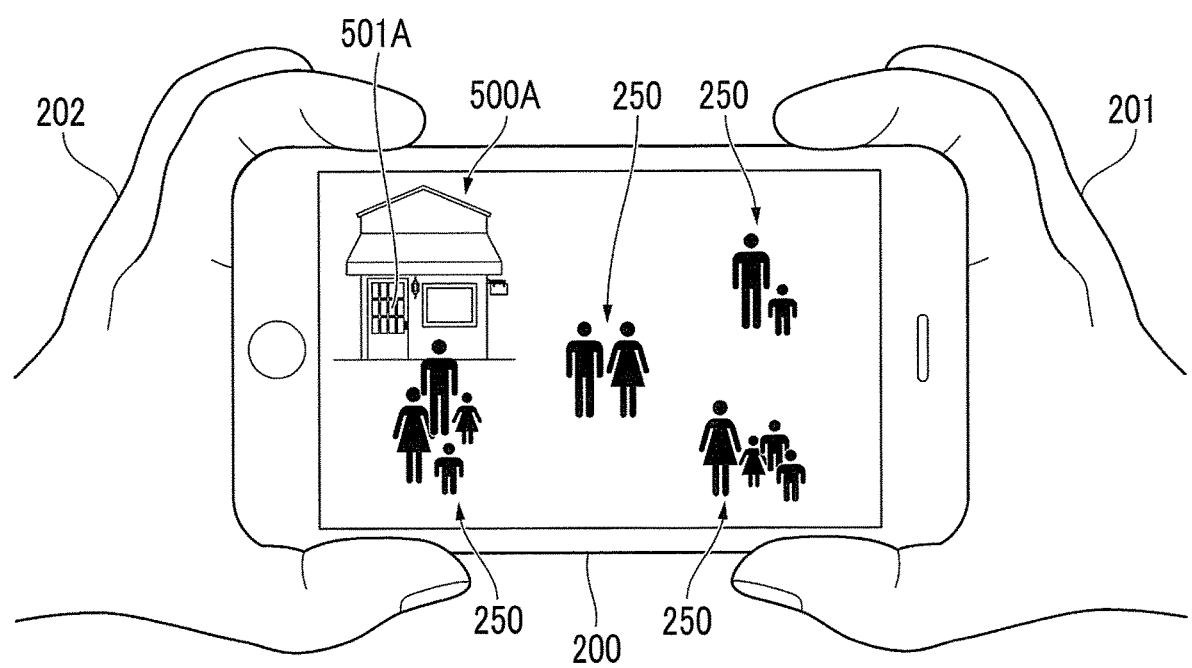

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-053425 filed Mar. 20, 2018.

BACKGROUND

(i) Technical Field

The present invention relates to an information processing apparatus and a non-transitory computer readable medium storing a program.

(ii) Related Art

There is a technique of acquiring and displaying waiting time and order in a queue in a waiting room or a parking lot through the Internet.

SUMMARY

In notifying a user of information on waiting for receiving a specific service, in a case of notifying of numerical values such as the number of people waiting in a queue for the service ahead of the user or the time required for the user to receive the service, it is hard to feel as if the user is actually looking at people lined up to receive the service ahead of the user.

Aspects of non-limiting embodiments of the present disclosure relate to an information processing apparatus which makes it easier to feel as if the user is actually looking at people lined up to receive a specific service ahead of the user, as compared to a case where information on waiting is notified as a numerical value, in a case of notifying a user of information on waiting for receiving the service, and a non-transitory computer readable medium storing a program.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquisition unit that acquires information on waiting for receiving a specific service; and a display control unit that displays an image of a virtual person, based on the information on waiting, in a case where a real place or apparatus managed in association with the specific service is recognized.

BRIEF DESCRIPTION OF THE DRAWINGS

Exemplary embodiment(s) of the present invention will be described in detail based on the following figures, wherein:

FIG. 11A shows an initial state, FIG. 11B shows a state after an icon is added to a waiting list, and FIG. 11C shows a case where the waiting list is updated;

FIG. 12A is an example of displaying translucent icons, and FIG. 12B is an example in which no definite row is formed;

FIG. 13A is an example of displaying the types of jobs and the number of sheets which are reserved in a case of joining a waiting list, by numbers, and FIG. 13B is an example of expressing the number of sheets by the thickness of a picture of a document;

FIG. 14A is an example of displaying the expected time of work (waiting time) by the height of the icon, and FIG. 14B is an example of expressing the expected time of work (waiting time) by color;

FIG. 20A is a display before cancellation and FIG. 20B is a display after cancellation;

FIG. 21A and FIG. 21B are diagrams for explaining other display examples in a case where there is cancellation of waiting. FIG. 21A is a display before cancellation and FIG. 21B is a display after cancellation;

FIG. 23 is a diagram for explaining a case of using a technique called augmented reality or mixed reality;

FIG. 27 is a diagram for explaining a display example of icons in a case of capturing an entrance of a restaurant with a smartphone;

FIG. 28 is a diagram for explaining another display example of icons in a case of capturing an entrance of a restaurant with a smartphone;

DETAILED DESCRIPTION

Hereinafter, exemplary embodiments of the present invention will be described with reference to the drawings.

Exemplary Embodiment 1

System Configuration

Figure 1:
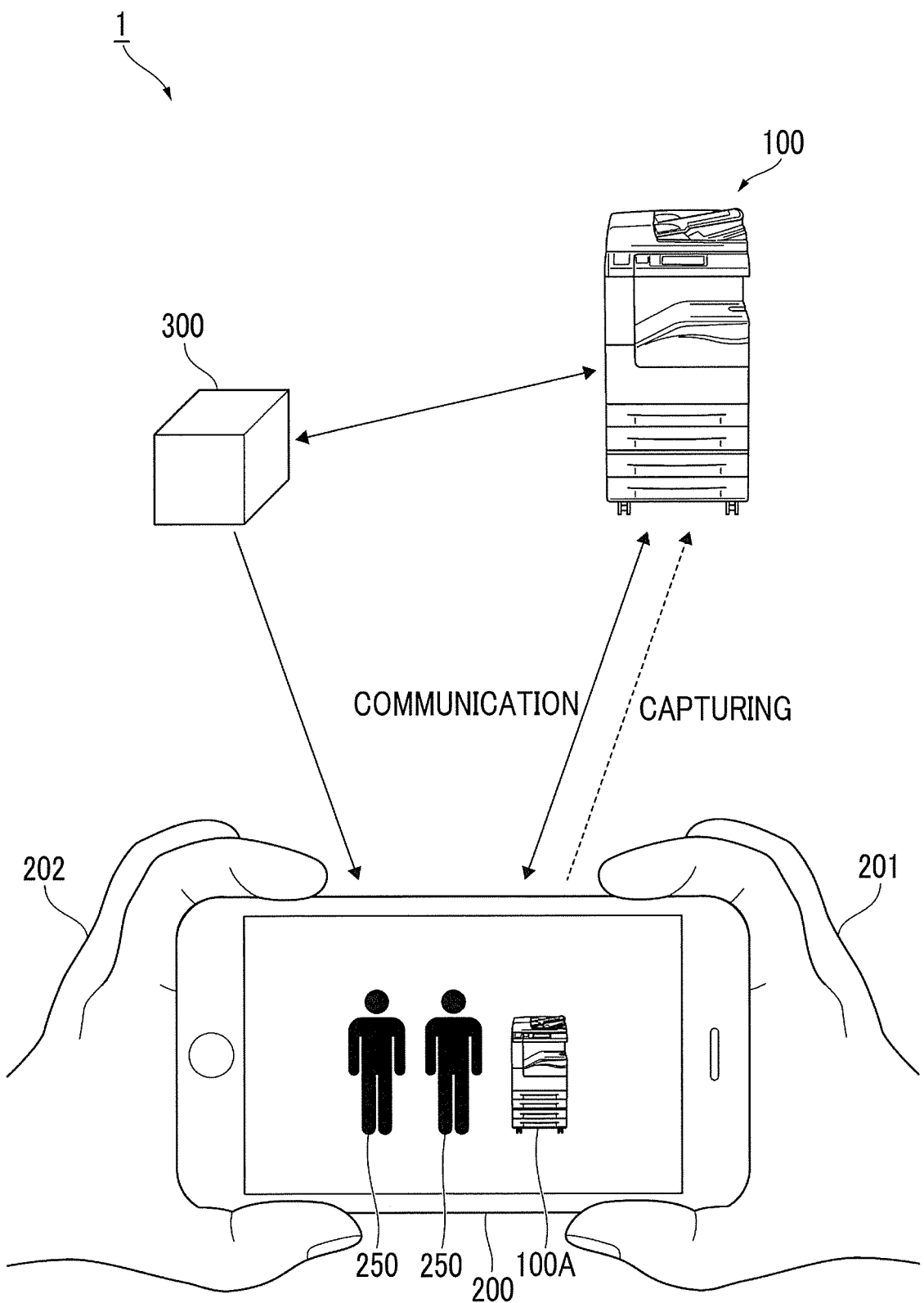
FIG. 1 is a diagram illustrating a configuration example of an information processing system used in Exemplary Embodiment 1.

FIG. 1 is a diagram illustrating a configuration example of an information processing system 1 according to Exemplary Embodiment 1.

In the present exemplary embodiment, the information processing system 1 provides a service for notifying the number of waiting people.

The information processing system 1 shown in FIG. 1 includes an image forming apparatus 100 that forms an image on a recording material (sheet), a smartphone 200 that captures the image forming apparatus 100, an icon distribution server 300 that distributes humanoid icons 250.

All the image forming apparatus 100, the smartphone 200, and the icon distribution server 300 here are examples of the information processing apparatus.

Further, the image forming apparatus 100 is also an example of an actually existing apparatus that is managed in association with a specific service. There are four specific services in the present exemplary embodiment including printing, copying, reading (scanning) of a document, and facsimile (fax).

FIG. 1 represents a scene where a user using service for notifying the number of waiting people is capturing an image forming apparatus 100, which is a target apparatus of the notification service, with the smartphone 200.

In the scene of using the service for notifying the number of waiting people, there are cases where a user who wants to use, for example, the image forming apparatus 100 wants to check the number of people waiting at the current time before joining a waiting list.

In another example, for example, a user who needs to leave the image forming apparatus 100 during waiting may want to check the number of waiting people and a change in the number of waiting people at the current time.

In FIG. 1, the user supports the smartphone 200 with the right hand 201 and the left hand 202.

In the case of FIG. 1, in spite of the absence of a person in the vicinity of the image forming apparatus 100 in the real space, humanoid icons 250 are displayed in addition to the image 100A of the image forming apparatus on the screen of the smartphone 200.

The icon 250 is an image of a virtual person displayed by the smartphone 200 through image processing in order to represent the number of people waiting for the image forming apparatus 100. In the case of FIG. 1, the number of waiting people is two. A virtual person means a person who is not actually present in the real space. For example, it is a person who is not in the vicinity of the image forming apparatus 100.

In the case of FIG. 1, the icons 250 corresponding to the waiting people are displayed in a row, starting from the position of the image forming apparatus 100 which is the waiting target. In the case of FIG. 1, the icon 250 is displayed along the wall or the path where the image forming apparatus 100 is disposed. However, the row of icons 250 may be displayed so as to be aligned in the direction opposite to the image forming apparatus 100.

In the present exemplary embodiment, the row of icons 250 is displayed so as not to overlap the space exclusively owned by the actual article (here, the image forming apparatus 100). This is to increase the sense of reality.

In a case where a place assumed to display the icon 250 is prepared in the real space, the icon 250 may be preferentially displayed in the prepared space.

In FIG. 1, since the number of waiting people is two, the row of icons 250 is linear, but in the case where the row becomes longer, the row may be displayed so as to be bent. A method of displaying the row may be selected by the administrator or the user of the system. The user who selects the method of displaying the row includes, for example, a person who is planning to use the image forming apparatus 100, and a person who has already joined a waiting list for use of the image forming apparatus 100. In addition, the user here may include a person who is using the image forming apparatus 100.

In FIG. 1, the icons 250 are displayed such that they do not overlap each other on the screen, but they may be displayed such that parts of the icons overlap each other. In a case where the row becomes longer, by displaying parts of the icons so as to overlap, it is possible to increase the number of icons 250 displayed on the screen.

In the case of FIG. 1, the shapes of the icons 250 are the same. However, in the form of display of the icon 250, information on the attribute of the person waiting may be reflected. The information on the attribute is information on the characteristics of a waiting person, such as age and gender, and as a display in which information on the attribute is reflected, for example, gender, the height, or the like may be reflected in the display.

Although FIG. 1 shows a case where the icon 250 is a standing figure, the icon 250 may be displayed by representing various postures that an actual person is able to take, such as a posture sitting on a chair and a posture squatting down on a chair.

In addition, the icon 250 illustrated in FIG. 1 represents the whole body of a person, but the icon 250 may express only a part of the body (for example, only the face or only the upper body). Further, the icon 250 needs not be limited to a humanoid, but may be represented by a figure such as a cylindrical shape, for example. Further, instead of the icon 250, a photograph of an actual person may be used.

In the case of FIG. 1, the icon 250 is displayed as a two-dimensional image, but it may be displayed as a three-dimensional image (stereoscopic image). Three-dimensional display of the icon 250 makes it easier for the user to realize the number of waiting people.

In the case of FIG. 1, the icon 250 located at the head of the row is displayed on the front side of the image 100A of the image forming apparatus with reference to the position of the user. In other words, the icon 250 is displayed so as to be superimposed on the upper layer of the image 100A of the image forming apparatus.

Since the icon 250 located at the head of the row is displayed so as to be superimposed on the image 100A of the image forming apparatus, it becomes clear which image forming apparatus 100 the row represented by the icon 250 is associated with.

In particular, in a case where plural rows are displayed in one screen, it is easy to check which apparatus each row corresponds to.

In the present exemplary embodiment, one icon 250 is displayed as one object (an image that is a unit of drawing). However, plural icons 250 may be displayed as one object.

Further, in the case of FIG. 1, the icon 250 is displayed as an opaque object. Therefore, in an area where the icon 250 is superimposed, a virtual person corresponding to the icon 250 is visually recognized on the front side of the actual image forming apparatus 100.

However, the display of the icon 250 may make it difficult to recognize the head of the row. For example, the image forming apparatus 100 may be hidden by the opaque icon 250. In this case, it is difficult to check what the waiting targets are by only displaying the screen.

In such a case, the icon 250 may be displayed as a translucent image. In a case where the icon 250 is displayed in a translucent manner, the image forming apparatus 100 located on the far side may be visually recognized through the icon 250.

Incidentally, the icon 250 may also be displayed by a contour line. In a case of the contour line, even in a case where the icon 250 overlaps the image 100A of the image forming apparatus, deterioration in the visibility of the image 100A of the image forming apparatus is reduced.

Whether to display the icon 250 as opaque, translucent, or the like may be selected by the system administrator or the user.

In the case of FIG. 1, the humanoid icons 250 on the screen are displayed in dimensions similar to an actual person (for example, an adult) so as to make it easier for the user to realize a waiting situation.

In FIG. 1, the height of the icon 250 is adjusted to be higher than the image 100A of the image forming apparatus.

Preferably, for example, the size of the icon 250 on the screen is adjusted according to the size of the image of the apparatus that is the target of waiting (here, the image 100A of the image forming apparatus).

The adjustment of the dimension of the icon 250 may be performed by a user operating the smartphone 200, may be executed by the smartphone 200 that detects the size of the image 100A of the image forming apparatus using an image recognition technique, or may be executed by the icon distribution server 300 that has acquired the image data of the smartphone 200.

For example, the user of the smartphone 200 may designate the display dimension of the icon 250 on the screen from among several types (for example, large, medium, small), or designate a specific dimension (for example, 2 cm).

In the case of the present exemplary embodiment, it is assumed that the number of waiting people does not include a person who is using the image forming apparatus 100.

However, the person in use may be included in the number of waiting people. For example, a person who is copying an image of a document by using the image forming apparatus 100 may be handled as the person at the head of the waiting queue.

Whether or not to include a person in use in the number of waiting people may be set by, for example, the administrator of the image forming apparatus 100, the provider of a service notifying the number of waiting people by the icon 250, the user who operates the smartphone 200, or the like. The setting may be changed at any time.

In addition, the icons 250 to be displayed on the screen may be limited to the people ahead of the user in order, or may be limited to the people up to the user in order, or may include people behind the user in order. In the case where the order is ahead of the user or the order is up to the user, it is easy to realize the number of waiting people and the waiting time. On the other hand, in the case of displaying also icons whose order is behind the user, it is easy to realize the current waiting situation for the image forming apparatus 100 or the influence of cancellation of waiting.

Configuration of each Apparatus

In the following, a configuration example of apparatuses constituting the information processing system 1 (see FIG. 1) will be described.

Configuration of image forming apparatus 100

Figure 2:
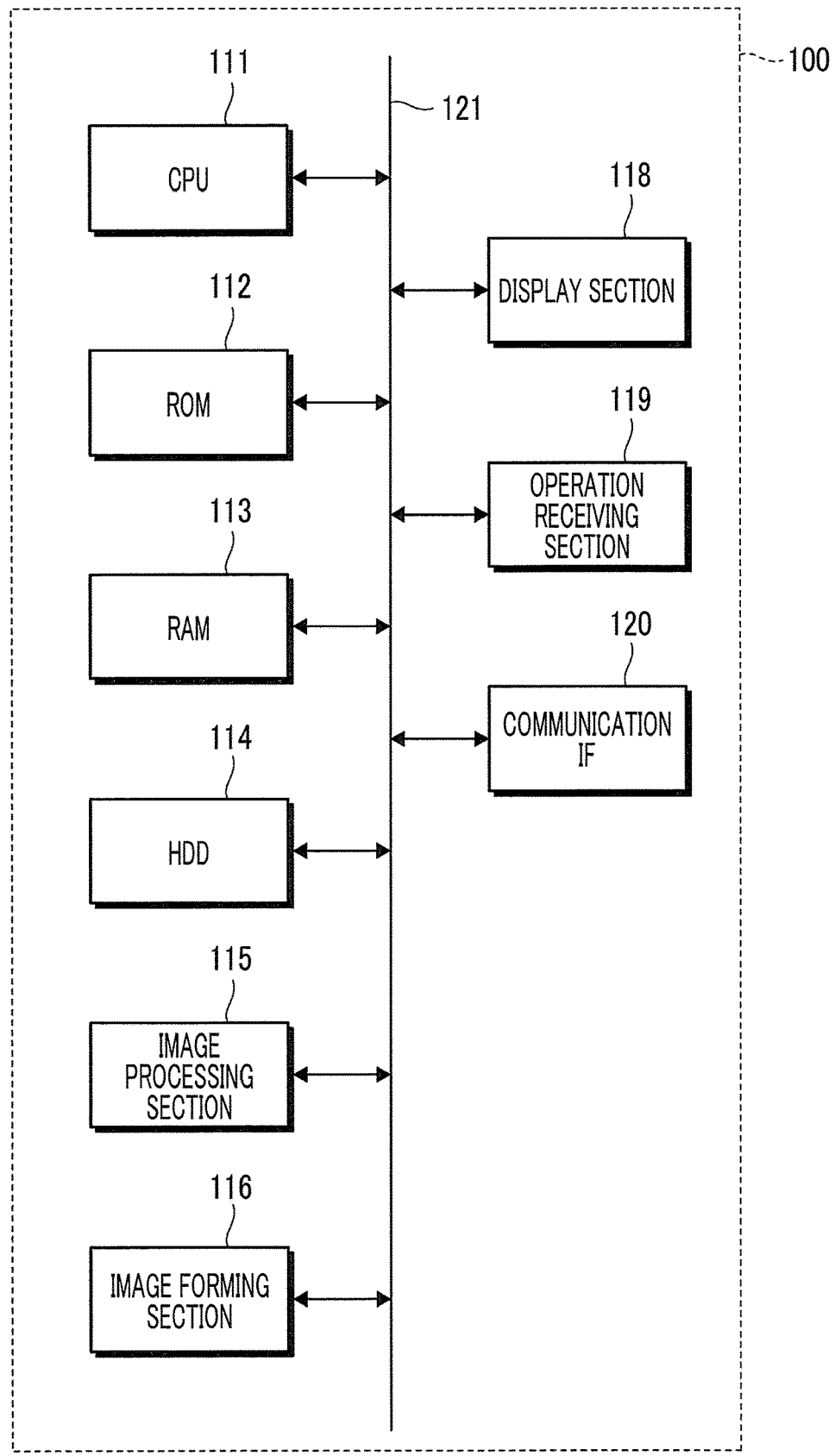
FIG. 2 is a diagram illustrating an example of a hardware configuration of an image forming apparatus used in Exemplary Embodiment 1.

FIG. 2 is a diagram illustrating an example of a hardware configuration of the image forming apparatus 100 used in Exemplary Embodiment 1.

The image forming apparatus 100 includes a central processing unit (CPU) 111 that controls the entire apparatus by executing a program (including firmware), a ROM 112 that stores programs such as a basic input output system (BIOS) and firmware, a random access memory (RAM) 113 used as a program execution area.

The CPU 111, the ROM 112, and the RAM 113 function as a computer.

In addition, the image forming apparatus 100 includes a hard disk device (HDD) 114 that stores image data, management data, and the like, an image processing section 115 that performs an image process such as color correction and gradation correction on the image data, and an image forming section 116 that forms an image on paper by an electrophotographic method or an inkjet method, for example.

Further, the image forming apparatus 100 is provided with a display section 118 that displays a user interface screen, and an operation receiving section 119 that receives user's operation. These constitute a user interface.

In addition, the image forming apparatus 100 is provided with a communication interface (communication IF) 120 used for communication with the outside.

The above-described sections are mutually connected through a bus 121. Sections exchange data through the bus 121.

Figure 3:
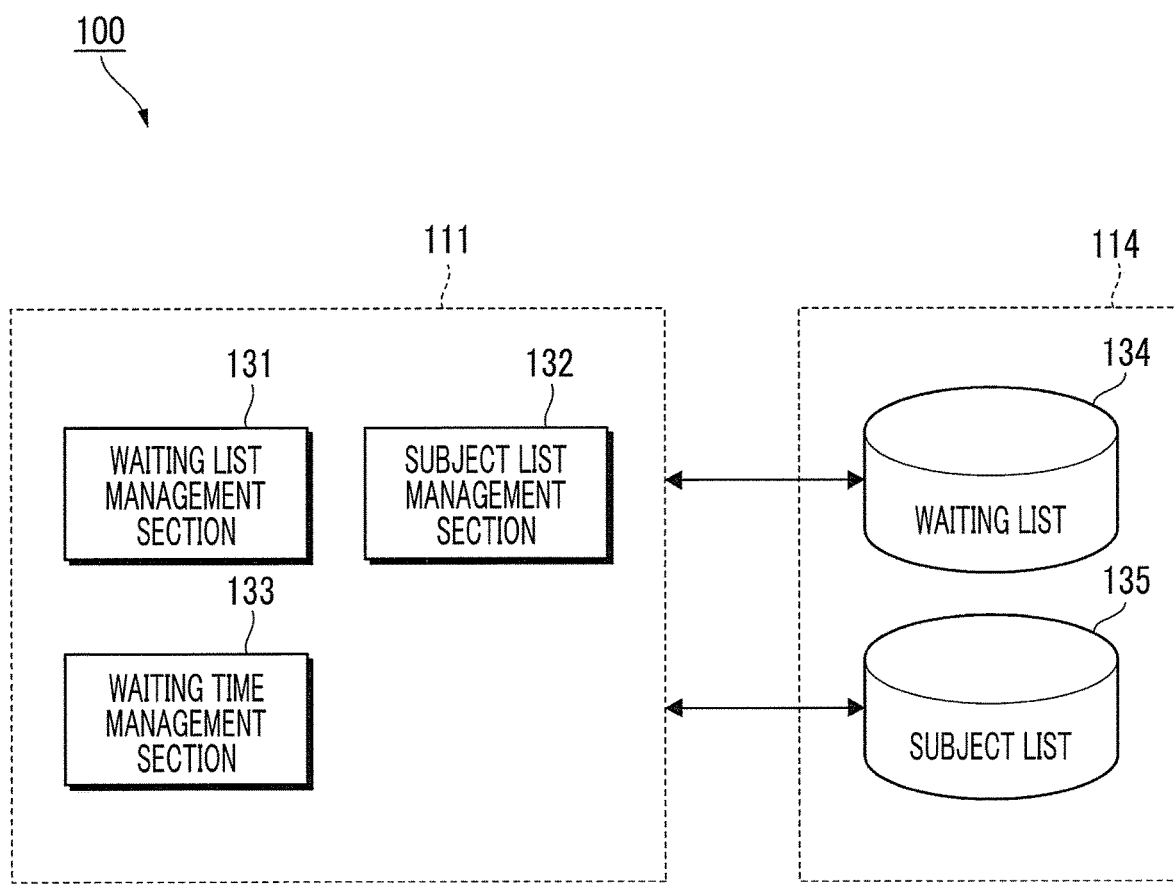
FIG. 3 is a diagram illustrating an example of a functional configuration of the image forming apparatus used in Exemplary Embodiment 1.

FIG. 3 is a diagram illustrating an example of a functional configuration of the image forming apparatus 100 used in Exemplary Embodiment 1.

The functions shown in FIG. 3 are realized by the CPU 111 executing a program.

Further, FIG. 3 illustrates functions related to a service for notifying the number of waiting people, among the functions realized through the execution of the program.

In the case of the present exemplary embodiment, the image forming apparatus 100 functions as a waiting list management section 131 that manages a waiting list 134, a subject list management section 132 that manages a subject list 135, and a waiting time management section 133 that manages a waiting time for each user who is waiting.

Here, the waiting list 134 and the subject list 135 are stored in the hard disk device 114.

In the waiting list 134, the information on the user who has reserved the use of the image forming apparatus 100 is described in order of reservation. The waiting list 134 is an example of information on waiting.

In the case of the present exemplary embodiment, reservation of use of the image forming apparatus 100 is executed based on reception of a job transmitted from the smartphone 200 or a computer (not shown). That is, it is executed through reception of a print job, a copy job, a reading (scanning) job of a document, and a facsimile (fax) job. At the time of reservation, the number of sheets used for each job may be registered.

In addition, reservation for waiting that does not specify the job type and the scheduled number of sheets may be possible.

The job type and the scheduled number of sheets here are examples of the information on the provided specific service. Information related to the provision of the service includes information such as the type of the service to be provided, the time required for providing the service, and the like.

In the subject list 135, the subjects of the service for notifying the number of waiting people are described.

In the case of the present exemplary embodiment, in the subject list 135, a communication address (for example, Internet Protocol (IP) address) necessary for notifying the subject of the waiting list 134 and the icon 250 (see FIG. 1) are included.

Registration and updating of the subject list may be limited to people with administrative authority.

In the present exemplary embodiment, addition and deletion of the information on the user who operates the smartphone 200 is permitted, as long as it is communication from the smartphone 200 in which software corresponding to the service for notifying the number of waiting people is installed.

The waiting time management section 133 manages the waiting time elapsed after being registered in the waiting list 134 for each user, and provide function that inquires of the user whose waiting time exceeds a predetermined time (reference time) about whether or not to continue waiting.

In a case where there is a response to the inquiry from the user, the waiting time management section 133 follows a response from the user.

On the other hand, in a case where there is no response to the inquiry from the user within a predetermined time (for example, within one minute), the waiting time management section 133 deletes the information on the target user from the waiting list 134. This function is prepared to reflect on the waiting list 134 the information on the user who has quitted waiting without performing an explicit cancellation operation.

The time to wait for a response may be set by the system administrator or the like, or may be set by each person who is waiting. In a case where time is set by each user, the time may be different for each individual.

However, the information on the target user may not be deleted from the waiting list 134, even in a case where there is no response. This is because it may not be able to respond within the time set for the response in some circumstances.

Further, in a case where there is no response to the inquiry, the inquiry is further made several times, but irrespective of that, in a case where there is still no response, the information on the target user may be deleted from the waiting list 134.

Configuration of Smartphone 200

Figure 4:
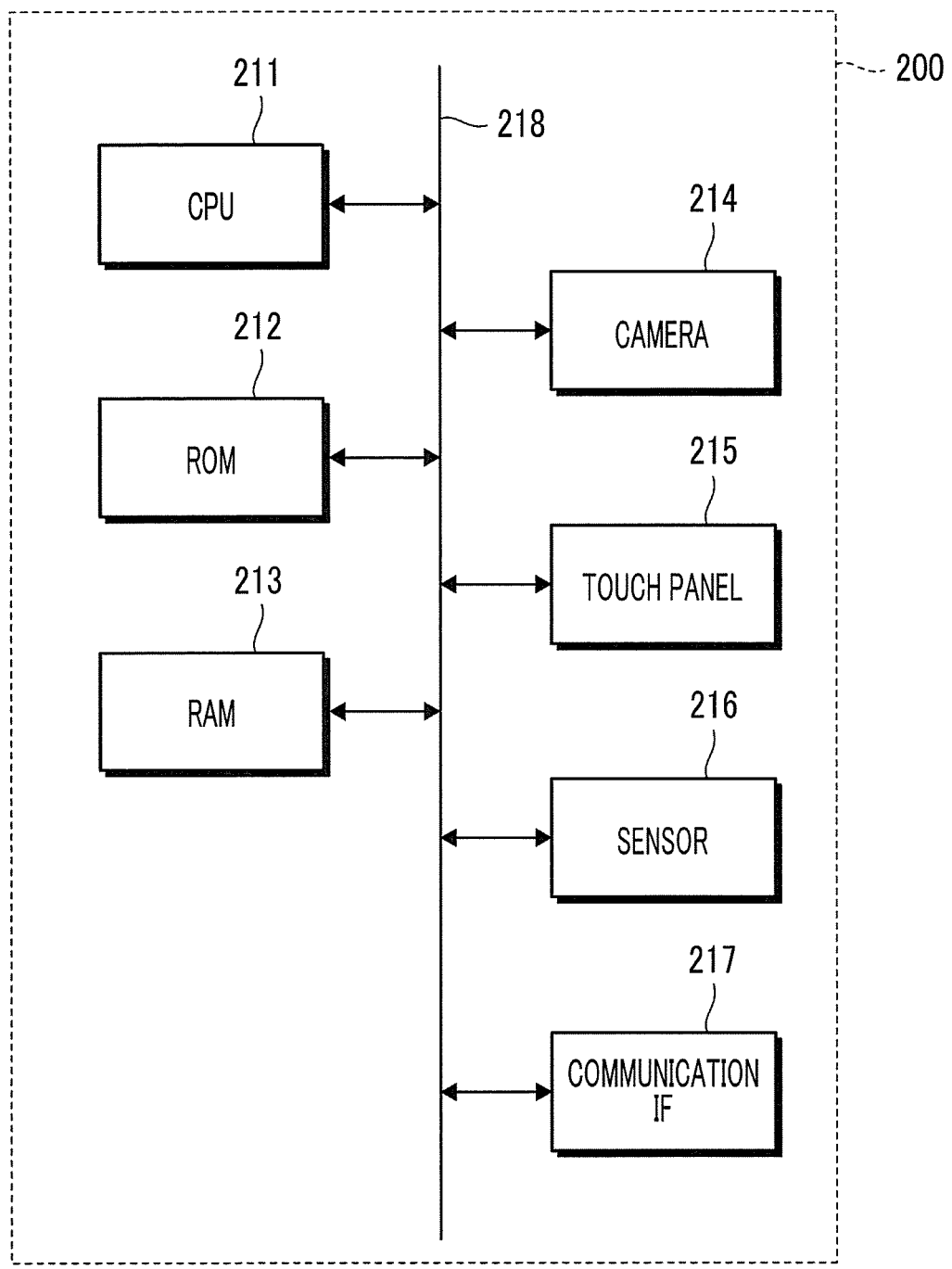
FIG. 4 is a diagram illustrating an example of a hardware configuration of a smartphone used in Exemplary Embodiment 1.

FIG. 4 is a diagram illustrating an example of a hardware configuration of the smartphone 200 used in Exemplary Embodiment 1.

The smartphone 200 includes a central processing unit (CPU) 211 that controls the entire apparatus by executing a program (including basic software), a ROM 212 that stores programs such as a basic input output system (BIOS) and basic software, a random access memory (RAM) 213 used as a program execution area.

The CPU 211, the ROM 212, and the RAM 213 function as a computer. The RAM 213 here also includes an additional RAM.

Further, the smartphone 200 includes a camera 214, a touch panel 215 used for displaying an operation screen and inputting an operation, various sensors 216, and a communication interface (communication IF) 217 used for communication with the outside.

The above-described sections are mutually connected through a bus 218. Sections exchange data through the bus 218.

Figure 5:
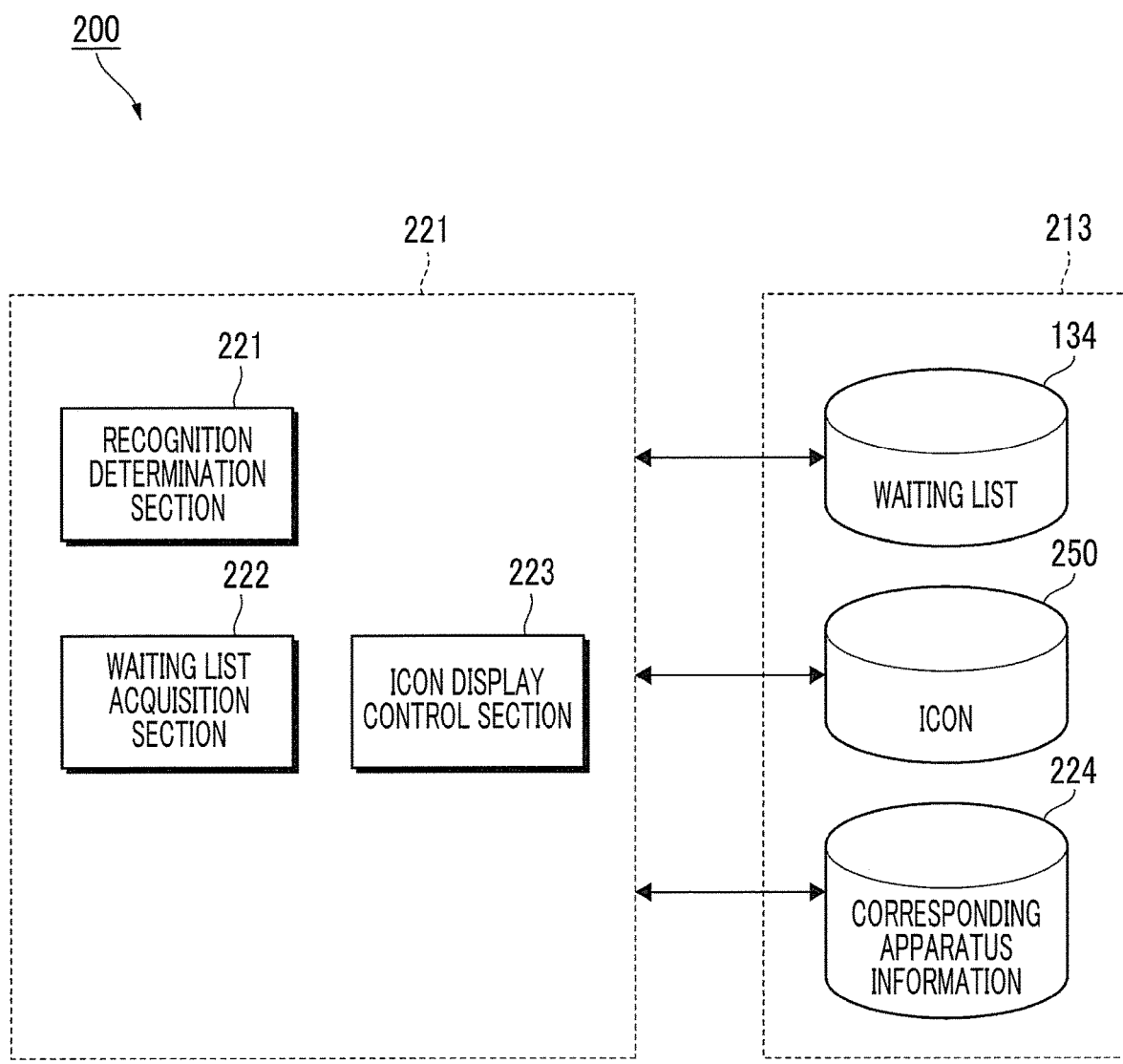
FIG. 5 is a diagram illustrating an example of a functional configuration of the smartphone used in Exemplary Embodiment 1.

FIG. 5 is a diagram illustrating an example of a functional configuration of the smartphone 200 used in Exemplary Embodiment 1.

The functions shown in FIG. 5 are realized by the CPU 211 executing a program.

Further, FIG. 5 illustrates functions related to a service for notifying the number of waiting people, among the functions realized through the execution of the program.

In the case of the present exemplary embodiment, the smartphone 200 functions as a recognition determination section 221 that determines whether or not an apparatus corresponding to the service for notifying the number of waiting people has been recognized, a waiting list acquisition section 222 that acquires the waiting list 134, and an icon display control section 223 that synthesizes the icon 250 on the image captured by the camera 214 (see FIG. 4) and displays the image on the touch panel 215 (see FIG. 4). In other words, the icon display control section 223 forms an image in which the icon 250 is superimposed on the image captured by the camera 214, and displays the image on the touch panel 215. The touch panel 215 is an example of the display unit.

The waiting list 134, the icon 250, and the corresponding apparatus information 224 are stored in the RAM 213.

The recognition determination section 221 in the present exemplary embodiment determines whether or not the apparatus corresponding to the waiting notification service (here, the image forming apparatus 100 (see FIG. 1)) has been recognized, by using the information obtained from the various sensors 216 mounted on the smartphone 200, the images captured by the camera 214, and the like.

In the case of the present exemplary embodiment, in a case where it is detected by an image recognition technique that an apparatus managed in advance as an apparatus corresponding to the waiting notification service is included in a predetermined part of the range captured by the camera 214, it is determined that the apparatus is recognized.

As another example, by using the position information and the smartphone 200, in a case where the smartphone 200 and the apparatus are in a predetermined positional relationship, it is determined that the apparatus is recognized.

Here, the predetermined positional relationship is a state in which the distance is at least equal to or less than a certain value, and preferably, for example, the direction of the smartphone faces the direction of the apparatus. As a method of recognizing the position of the smartphone, there is a method of using a beacon and method of acquiring the position information by GPS.

In addition, although the recognition determination section 221 determines the recognition of the apparatus corresponding to the waiting notification service, the recognition determination section 221 may recognize the place where the waiting notification service is provided. Even though the place where the notification service is provided is not the actual place where the service is actually provided, in a case where it is managed in association with the actual service, it may be a place different from the place where the service is actually provided. Information necessary for recognition is recorded as a part of the corresponding apparatus information 224. The corresponding apparatus information 224 may be installed as a part of software corresponding to the service for notifying the number of waiting people or may be acquired from the image forming apparatus 100.

Figure 6:
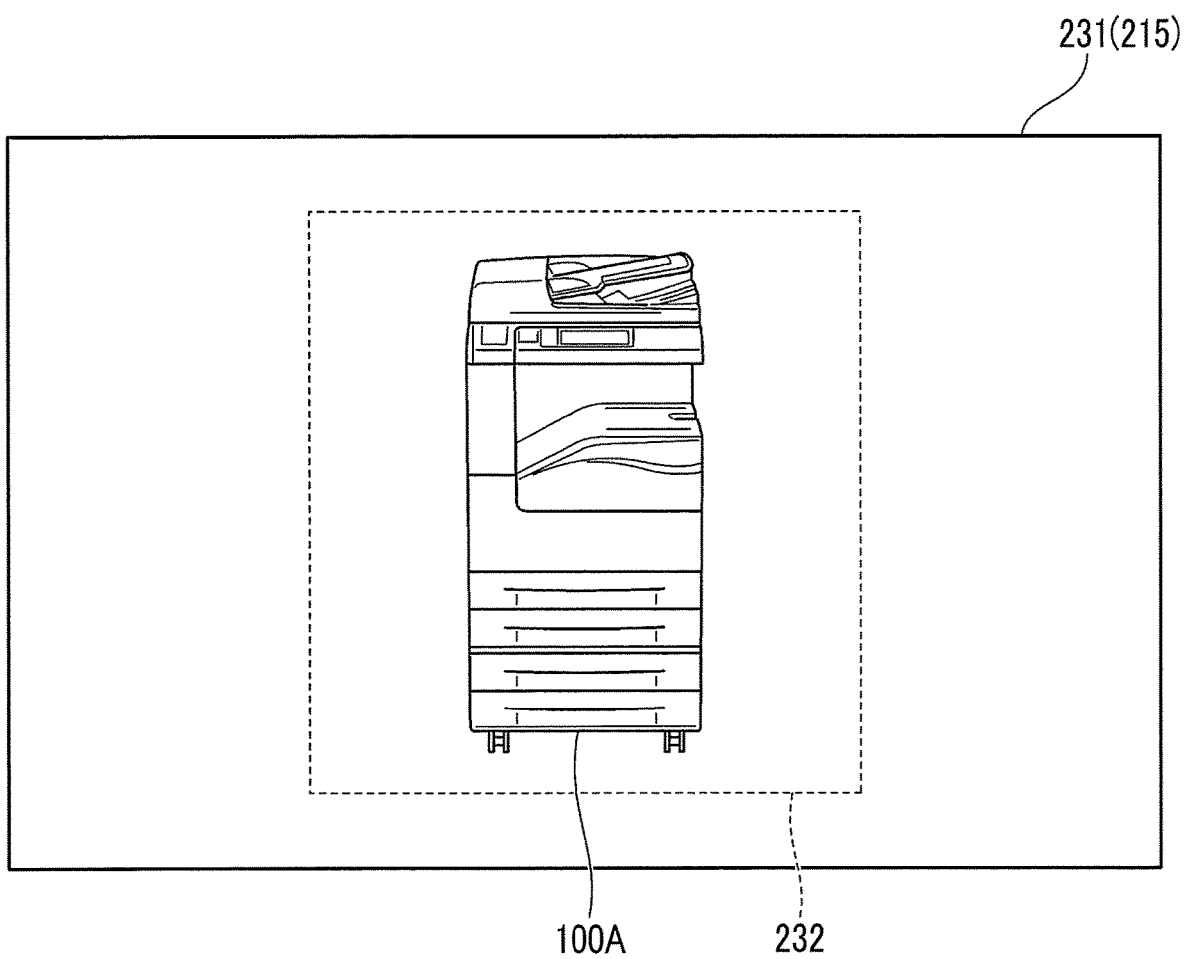
FIG. 6 is a diagram for explaining a range of an image used by a visual recognition detection section for image recognition.

FIG. 6 is a diagram for explaining a range of an image used by the recognition determination section 221 (see FIG. 5) for image recognition.

In FIG. 6, a rectangular range 231 indicated by the solid line shows the range of the image captured by the camera 214 (see FIG. 4) and displayed on the touch panel 215 (see FIG. 4).

On the other hand, a rectangular range 232 indicated by a broken line shows a range set in advance as an area where the line of sight of the user is likely to gather.

In a case where the image of the apparatus corresponding to the service (that is, the image 100A of the image forming apparatus) is included in the range 232, the recognition determination section 221 in the present exemplary embodiment considers that there is a high possibility that the user is visually recognizing the image forming apparatus 100 (see FIG. 1), and determines that the apparatus (image forming apparatus 100) has been recognized.

Therefore, in the case of the present exemplary embodiment, even in a case where the image 100A of the image forming apparatus is included in the range outside the range 232, it is considered that there is a low possibility that the user is visually recognizing the image forming apparatus 100 (see FIG. 1), and it is not determined that the apparatus has been recognized.

The dimension and arrangement of the range 232 may be adjusted by a system administrator or a user using the service. In the present exemplary embodiment, it may be referred to as indirect visual recognition of the apparatus in the sense that the user is visually recognizing the actual image forming apparatus 100 through the touch panel 215.

Return to the description of FIG. 5.

The waiting list acquisition section 222 is a function of acquiring the waiting list 134, according to a request from the recognition determination section 221 that has detected an apparatus corresponding to the service, an instruction from a user operating the smartphone 200 (see FIG. 1), or the notification from the image forming apparatus 100 (see FIG. 1).

The waiting list 134 may include information on attributes such as gender of a waiting individual and information on provision of a service such as the job type.

The waiting list acquisition section 222 is an example of an acquisition unit that acquires information on waiting for receiving a specific service.

The icon display control section 223 is a function of receiving the icon 250 distributed from the icon distribution server 300 and displaying it on the touch panel 215 (see FIG. 4).

The icon display control section 223 in the present exemplary embodiment displays the received icon 250 according to the waiting list 134. Further, as described above, in a case where the display dimension of the icon 250 is designated by the user, the display of the icon 250 on the touch panel 215 is adjusted according to the designated content.

The icon display control section 223 is an example of a display control unit.

Configuration of Icon Distribution Server 300

Figure 7:
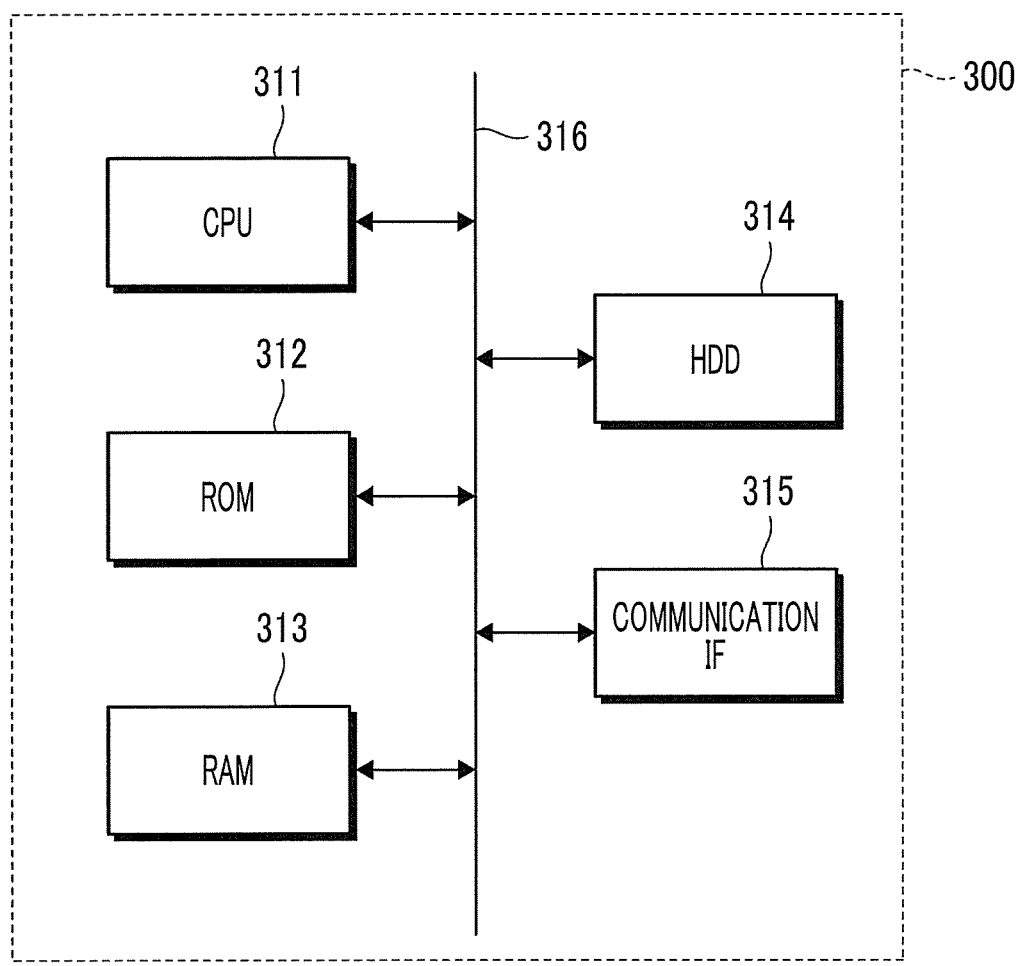
FIG. 7 is a diagram illustrating an example of a hardware configuration of an icon distribution server used in Exemplary Embodiment 1.

FIG. 7 is a diagram illustrating an example of a hardware configuration of the icon distribution server 300 used in Exemplary Embodiment 1.

The icon distribution server 300 includes a central processing unit (CPU) 311 that controls the entire apparatus by executing a program (including basic software), a ROM 312 that stores programs such as a basic input output system (BIOS) and basic software, a random access memory (RAM) 313 used as a program execution area.

The CPU 311, the ROM 312, and the RAM 313 function as a computer.

In addition, the icon distribution server 300 is provided with a hard disk device (HDD) 314 for storing image data, management data and the like, and a communication interface (communication IF) 315 used for communication with the outside.

The above-described sections are mutually connected through a bus 316. Sections exchange data through the bus 316.

Figure 8:
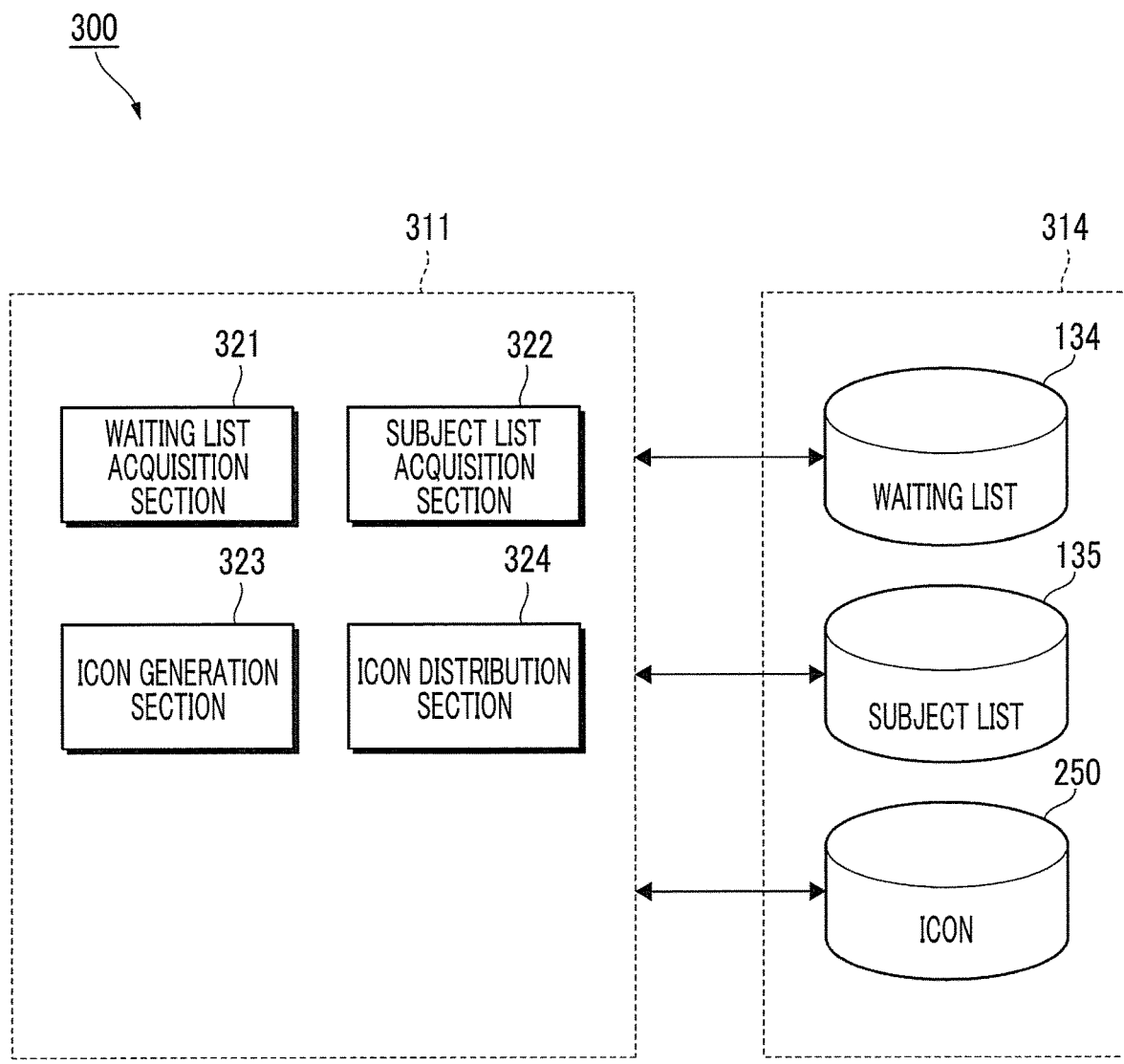
FIG. 8 is a diagram illustrating an example of a functional configuration of the icon distribution server used in Exemplary Embodiment 1.

FIG. 8 is a diagram illustrating an example of a functional configuration of the icon distribution server 300 used in Exemplary Embodiment 1.

The functions shown in FIG. 8 are realized by the CPU 311 executing a program.

Further, FIG. 8 illustrates functions related to a service for notifying the number of waiting people, among the functions realized through the execution of the program.

In the case of the present exemplary embodiment, the icon distribution server 300 functions as a waiting list acquisition section 321 that acquires the waiting list 134, a subject list acquisition section 322 that acquires the subject list 135, an icon generation section 323 that generates the icon 250, and an icon distribution section 324 that distributes the generated icon 250 to the subject.

Here, the waiting list 134, the subject list 135, and the icon 250 are stored in the hard disk device 314.

In the case of the present exemplary embodiment, the icon generation section 323 provides a function of generating icons 250 of the number of waiting people by using the waiting list 134. However, the icon generation section 323 may generate the icon 250 for one person regardless of the number of waiting people. In a case where the generated icon 250 is for one person, the smartphone 200 displays icons 250 of the number of people based on the waiting list 134.

The icon distribution section 324 provides a function of distributing the icon 250 to the user designated in the subject list 135.

Operation Related to Notification of Number of Waiting People

In the following, an example of the process related to the notification of the number of waiting people will be described using FIGS. 9 and 10.

Figure 9:
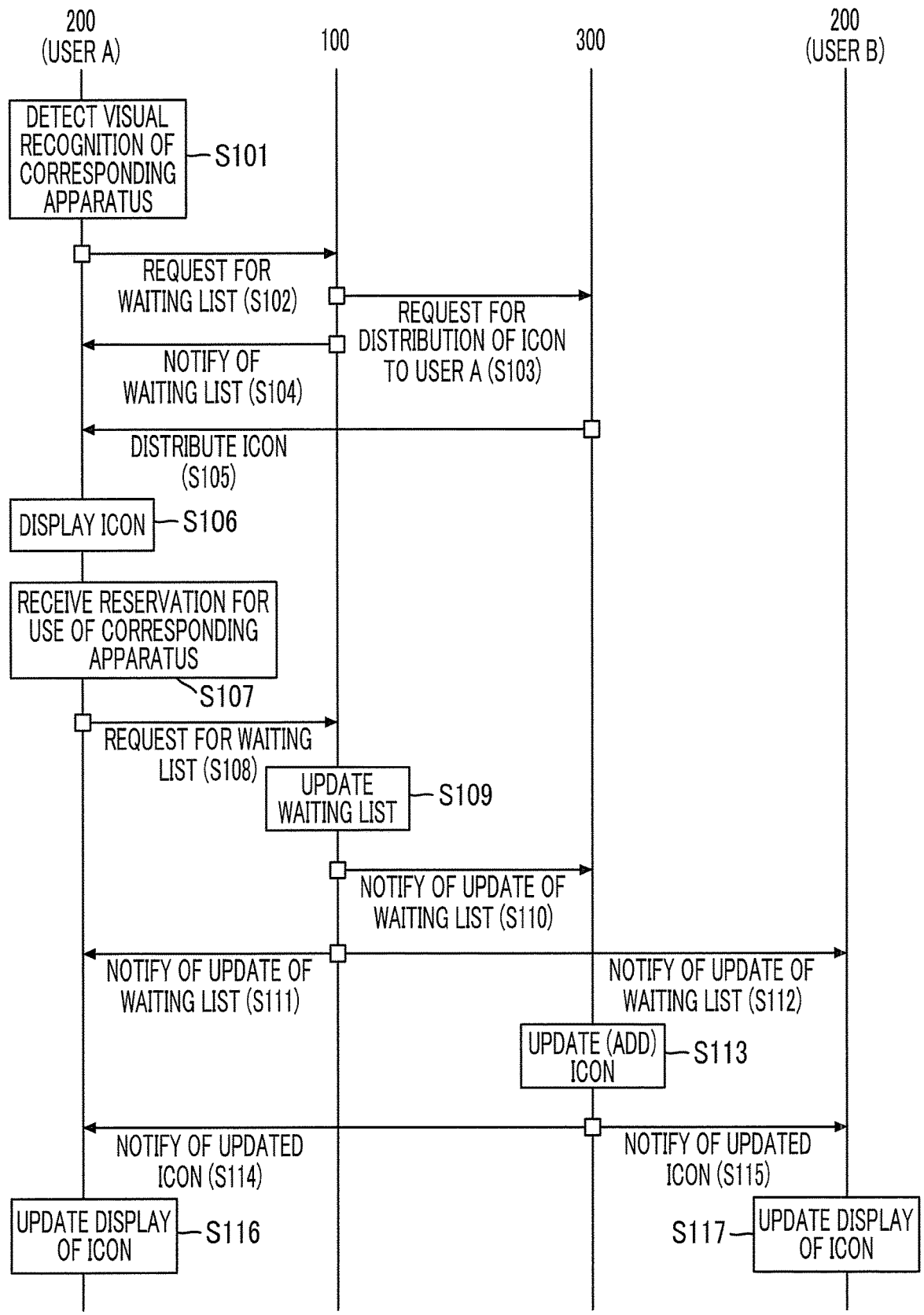
FIG. 9 is a flowchart for explaining an example of a process that is started in a case where visual recognition of an apparatus corresponding to a notification service is detected.

FIG. 9 is a flowchart for explaining an example of a process that is started in a case where visual recognition of an apparatus (here, the image forming apparatus 100) corresponding to a notification service is detected. The symbol S in FIG. 9 is an abbreviation of step.

In the case of FIG. 9, the smartphone 200 operated by the user A detects the visual recognition of the image forming apparatus 100 corresponding to the notification service (step S101).

As described above, in a case where the image 100A of the image forming apparatus is included in the predefined range 232 (see FIG. 6) in the vicinity of the center, the recognition determination section 221 (see FIG. 5) detects that the user visually recognizes the image forming apparatus 100.

In the case of the present exemplary embodiment, the smartphone 200 requests the waiting list 134 (see FIG. 3) from the image forming apparatus 100 that the user visually recognizes (step S102).

The image forming apparatus 100, which has received a request, requests the icon distribution server 300 to distribute the icon to the user A (step S103).

In addition, the image forming apparatus 100 notifies the smartphone 200 of the user A of the waiting list 134 (step S104).

On the other hand, the icon distribution server 300 distributes the icon 250 (see FIG. 1) to the smartphone 200 of the user A (step S105). In addition, the icon distribution server 300 generates the icon 250 using the held waiting list 134.

Next, the smartphone 200 of the user A displays the received icon 250 so as to be superimposed on the image 100A of the image forming apparatus displayed on the touch panel 215 (step S106).

Specifically, as shown in FIG. 1, icons 250 of the number of waiting people are displayed on the front side of the image 100A of the image forming apparatus.

The icon 250 is displayed in a dimension similar to an actual person. Therefore, there is an advantage that it is easier to realize the number of waiting people, compared to simply knowing the number of waiting people by numbers.

In FIG. 9, at this stage, the smartphone 200 receives the reservation for use of the corresponding apparatus (here, the image forming apparatus 100) by the user A (step S107).

The smartphone 200 of the user A, which has received a reservation, requests the image forming apparatus 100 to add the user A to the waiting list 134 (step S108). In the case of the present exemplary embodiment, information such as, for example, the job type and the number of sheets handled in the job is also notified to the image forming apparatus 100 at the time of reservation.

The image forming apparatus 100, which receives the notification, updates the waiting list 134 (step S109). Specifically, the user A is added to the end of the waiting list 134.

Thereafter, the image forming apparatus 100 notifies the icon distribution server 300, the smartphone 200 of the user A, and the smartphone 200 of the user B of the update of the waiting list 134 (steps 110 to 112). The user B here is a user who has already waited.

The icon distribution server 300, which receives the notification of update of the waiting list 134, updates the icon 250 (step S113), and notifies the users A and B of the updated icon 250 (steps S114 and S115).

As a result, the display of the icons 250 on the touch panel 215 (see FIG. 4) is updated in both the smartphone 200 of the user A who joins a waiting list and the smartphone 200 of the user B who has already joined a waiting list (steps S116 and S117).

Figure 10:
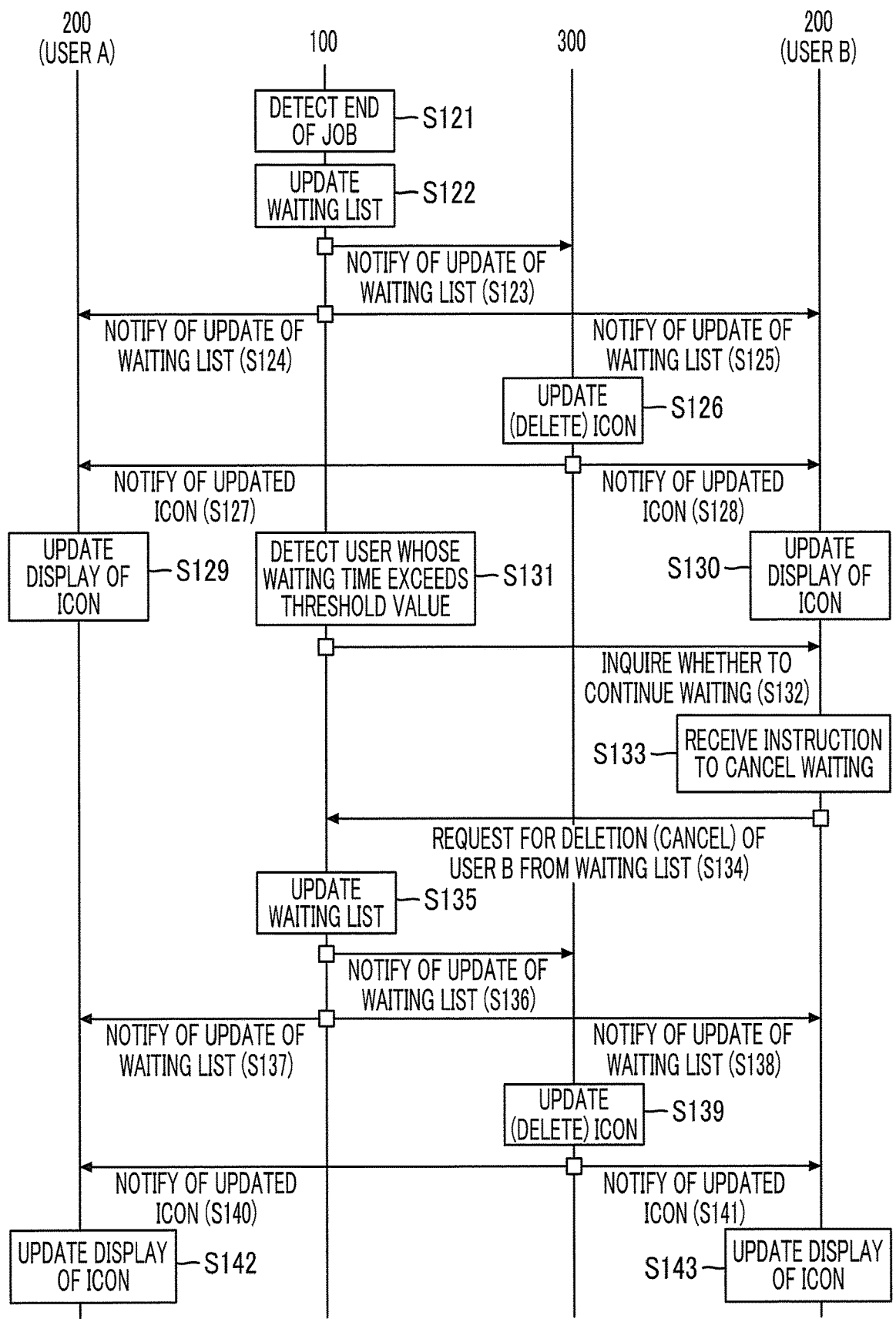
FIG. 10 is a flowchart for explaining an example of a process executed in a case where a job being executed in the image forming apparatus is ended and in a case where waiting is canceled by a user's intention.

FIG. 10 is a flowchart for explaining an example of a process executed in a case where a job being executed in the image forming apparatus 100 is ended and in a case where waiting is canceled by a user's intention.

First, the case where the image forming apparatus 100 detects the end of the job (step S121) will be described.

In a case of detecting the end of the job, the image forming apparatus 100 updates the waiting list 134 (step S122). Specifically, icon is moved forward one by one.

Thereafter, the image forming apparatus 100 notifies the icon distribution server 300, the smartphone 200 of the user A, and the smartphone 200 of the user B of the update of the waiting list 134 (steps S123 to S125).

The icon distribution server 300, which receives the notification of update of the waiting list 134, updates the icon 250 (step S126), and notifies the users A and B of the updated icon 250 (steps S127 and S128).

As a result, the display of the icon 250 on the touch panel 215 (see FIG. 4) is updated in both the smartphone 200 of the user A and the smartphone 200 of the user B (steps S129 and S130).

Incidentally, subtracting the number of people from the waiting list 134 is not limited to the case where the job being used ends.

For example, there is a case where the waiting is canceled by the user's intention.

FIG. 10 illustrates a case where the inquiry as the motivation is given from the image forming apparatus 100.

Here, the image forming apparatus 100 detects a user whose waiting time exceeds the threshold value (step S131).

In the case of FIG. 10, the waiting time of user B exceeds the threshold value. Therefore, the image forming apparatus 100 inquires of the user B about whether to continue waiting (step S132).

The user B who has received the notification determines whether or not to continue waiting by considering the number of waiting people at present. In FIG. 10, the user B who has received the notification quits waiting (that is, cancels).

In this case, the smartphone 200 of the user B receives an instruction to cancel the waiting (step S133) and requests the image forming apparatus 100 to delete the user B from the waiting list 134 (step S134).

The image forming apparatus 100, which receives the notification, updates the waiting list 134 (step S135).

Thereafter, the image forming apparatus 100 notifies the icon distribution server 300, the smartphone 200 of the user A, and the smartphone 200 of the user B of the update of the waiting list 134 (steps S136 to S138).

The icon distribution server 300, which receives the notification of update of the waiting list 134, updates the icon 250 (step S139), and notifies the users A and B of the updated icon 250 (steps S140 and S141).

As a result, the display of the icon 250 on the touch panel 215 (see FIG. 4) is updated in both the smartphone 200 of the user A and the smartphone 200 of the user B (steps S142 and S143).

In a case where the user B determines to continue waiting in response to the inquiry of step 132, the smartphone 200 of the user B receives an operation to continue waiting and notifies the image forming apparatus 100 of the result.

As a result, the display of the icon 250 on the smartphone 200 sequentially changes reflecting the latest waiting information. As a result, each user who is waiting is able to know the change in the number of waiting people through the decrease in the number of people of the icons 250.

Display Examples of Icon

Hereinafter, display examples of icons realized by using the above-described functions will be described.

As described above, the user using the service for notifying the number of waiting people is able to check a display example of the icons shown below, in a scene where the image forming apparatus 100 (see FIG. 1) which is a target apparatus of the notification service is captured by the smartphone 200 (see FIG. 1).

Display Example 1

Figure 11A:
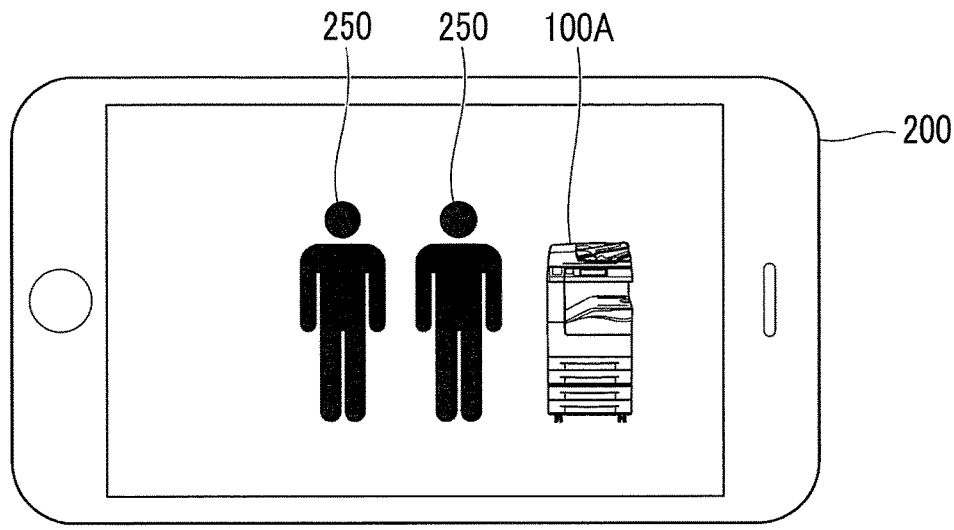
FIGS. 11A to 11C are diagrams illustrating display examples of icons in a case where an image forming apparatus in a real space is captured with a smartphone.
Figure 11B:
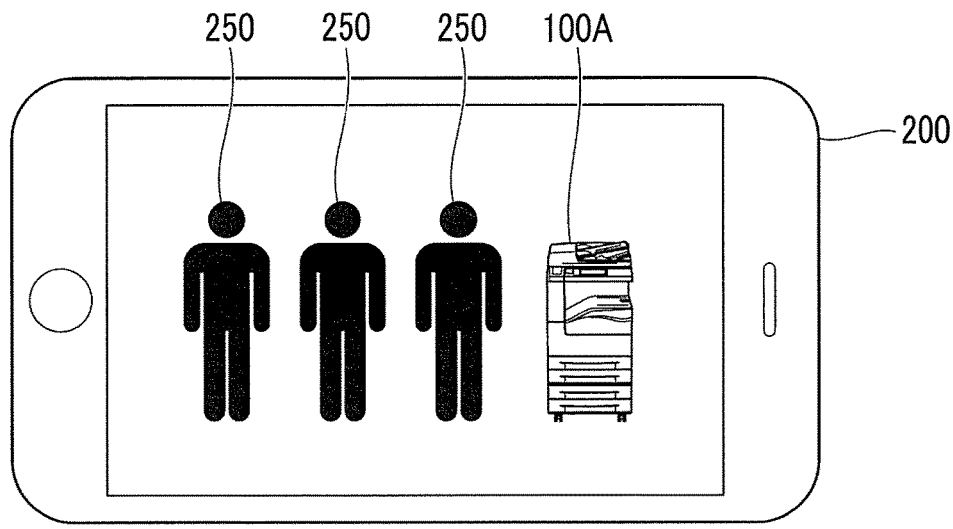
Figure 11C:
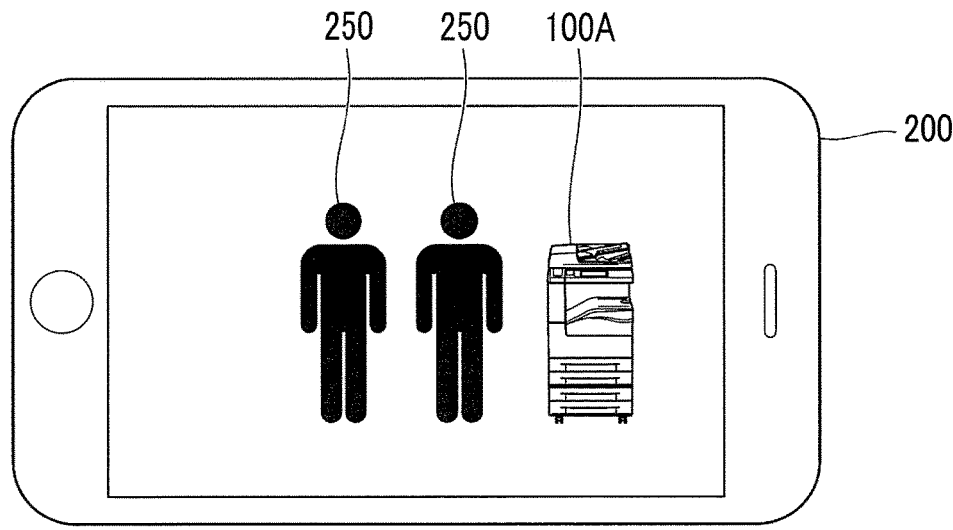

FIGS. 11A to 11C are diagrams illustrating display examples of icons 250 in a case where an image forming apparatus 100 (see FIG. 1) in a real space is captured with a smartphone 200. FIG. 11A shows the initial state, FIG. 11B shows the state after an icon is added to the waiting list, and FIG. 11C shows the case where the waiting list is updated.

In the case of FIGS. 11A to 11C, in the display of the icon 250, the number of icons is increased from two to three, and eventually returns to two people.

For example, the display in FIG. 11A corresponds to the display of the icon 250 in step 106 of FIG. 9. The display in FIG. 11B corresponds to the display in step 116 of FIG. 9 after requesting joining a waiting list. The display in FIG. 11C corresponds to the display in step 129 of FIG. 10 after the job being executed ends, or the display in step 142 in FIG. 10 in the case where cancellation occurs in the waiting.

As shown in FIGS. 11A to 11C, since the icon 250 is displayed in a size similar to a person, the user is able to check the number of waiting people and the changes, with visual reality.

In the case of FIGS. 11A to 11C, the icon 250 located at the head of the row does not overlap the image 100A of the image forming apparatus. However, starting from the position next to the image 100A of the image forming apparatus, the row of icons 250 expresses that the row of waiting is related to the image 100A of the image forming apparatus.

The Display Example 1 is used for checking the number of waiting people by users who are considering the use of the image forming apparatus from this and users who have already joined a waiting list.

Display Example 2

Figure 12A:
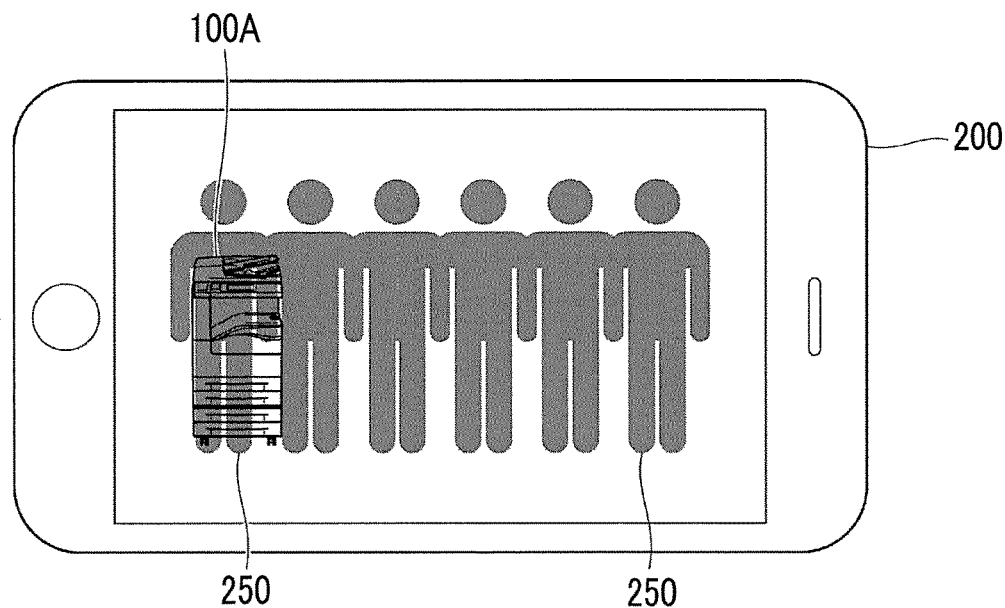
FIGS. 12A and 12B are diagrams illustrating other display examples of icons.
Figure 12B:
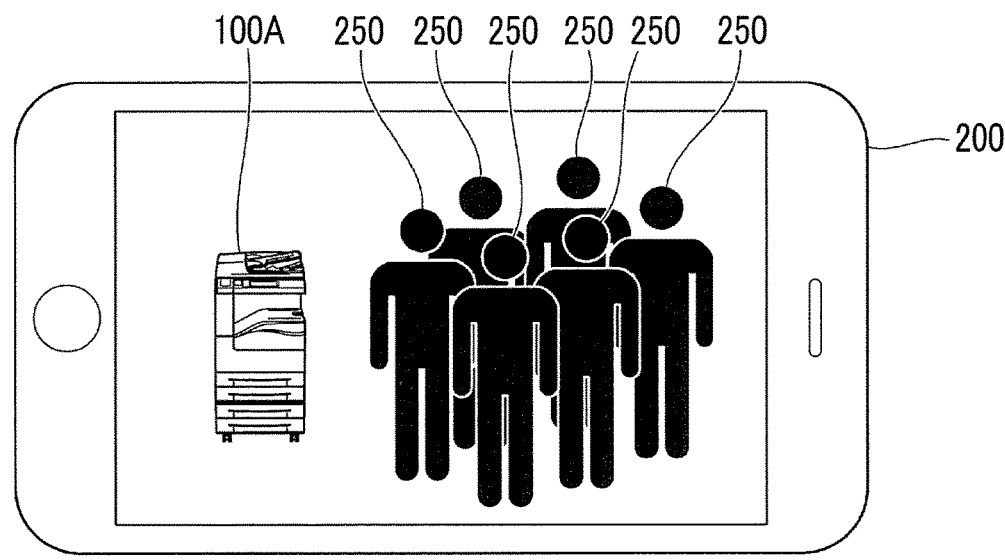

FIGS. 12A and 12B are diagrams illustrating other display examples of icons 250. FIG. 12A is an example of displaying translucent icons, and FIG. 12B is an example in which no definite row is formed.

In a case where the icon 250 is translucent as shown in FIG. 12A, even in a case where the number of displayed icons 250 is large, the checking of the number of people and the visibility of the landscape captured by the camera 214 (see FIG. 4) are compatible. That is, it may be checked that the row starts from the image forming apparatus 100.

In addition, in a case where icons are displayed as a group as in FIG. 12B, it is difficult to check the number of waiting people and the current turn, but it becomes easier to realize that the number of waiting people is large.

The Display Example 2 is also used for checking the number of waiting people by users who are considering the use of the image forming apparatus from this and users who have already joined a waiting list.

Display Example 3

Figure 13A:
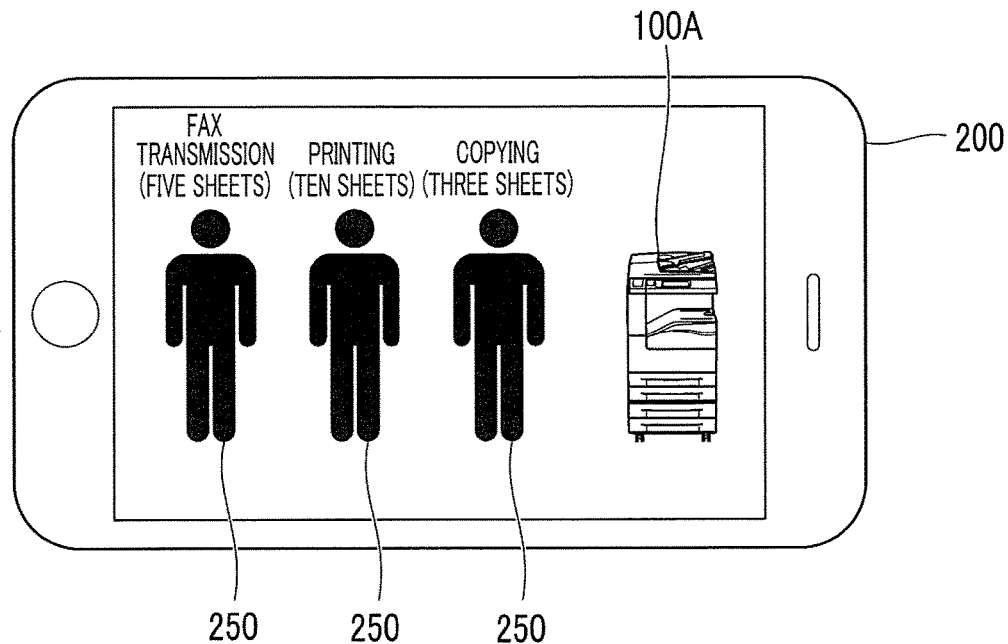
FIGS. 13A and 13B are diagrams illustrating display examples that support prediction of waiting time.
Figure 13B:
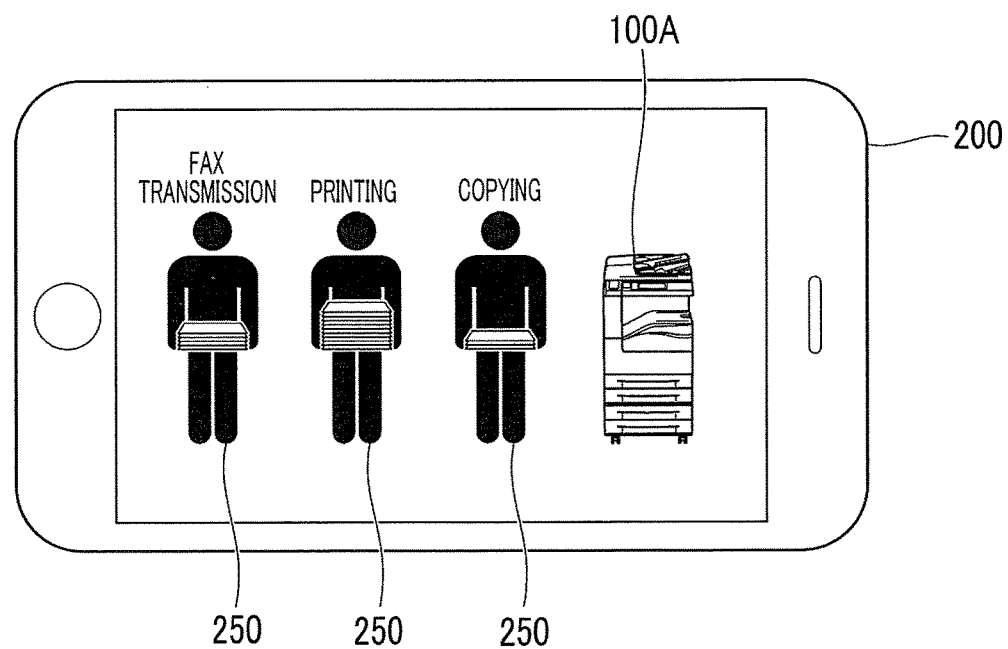

FIGS. 13A and 13B are diagrams illustrating display examples that support prediction of waiting time. FIG. 13A is an example of displaying the types of jobs and the number of sheets which are reserved in a case of joining a waiting list, by numbers, and FIG. 13B is an example of expressing the number of sheets by the thickness of a picture of a document.

FIGS. 13A and 13B, information related to the use of the image forming apparatus 100, such as the job type and the number of sheets, is added to the icon 250. These pieces of information are displayed so as to distinguish or identify the difference in the job type and the number of sheets.

For example, in the example of FIG. 13A, the person at the head of the waiting queue makes a reservation of three sheets of copying, the second person makes a reservation of ten sheets of printing, and the third person makes a reservation of five sheets of fax transmission. In this manner, in a case where the job type and the number of sheets are known, clues for predicting the waiting time may be obtained, as compared with the case where icons 250 of three people are simply displayed.

For example, in the example of FIG. 13B, the thickness of the document varies depending on the waiting order. Therefore, the user is able to easily imagine the approximate waiting time with the thickness of the document only by looking at the screen.

The thickness of the document is not limited to the number of sheets which is input at the time of reservation and may vary depending on the expected time (waiting time) of work. Further, the expected individual waiting time and the total waiting time required up to the user's turn may be displayed as numbers.

The Display Example 3 is also used for checking the number of waiting people by users who are considering the use of the image forming apparatus from this and users who have already joined a waiting list.

Display Example 4

Figure 14A:
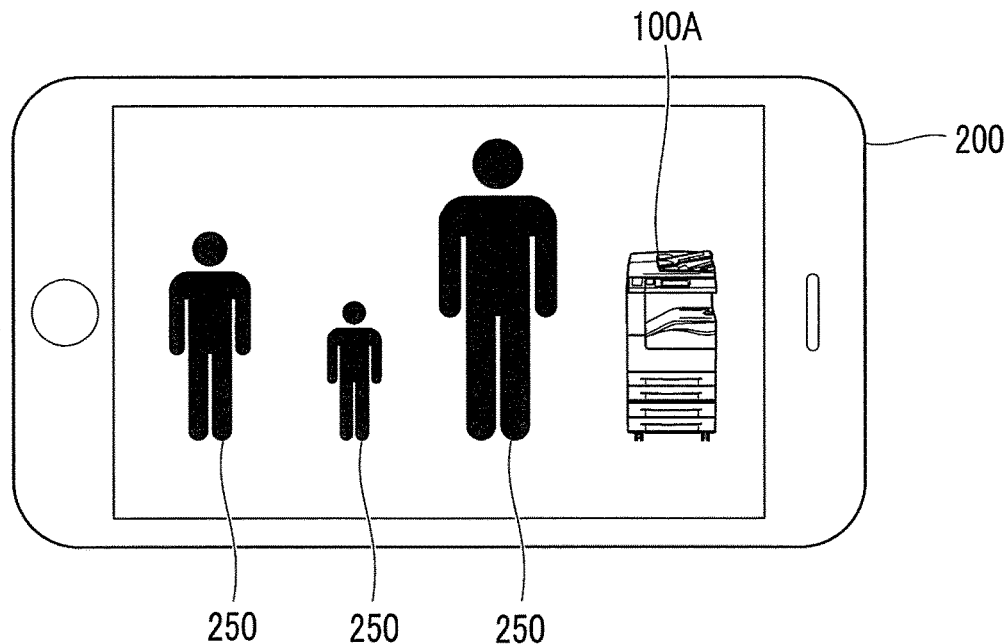
FIGS. 14A and 14B are diagrams illustrating other display examples that support prediction of waiting time.
Figure 14B:
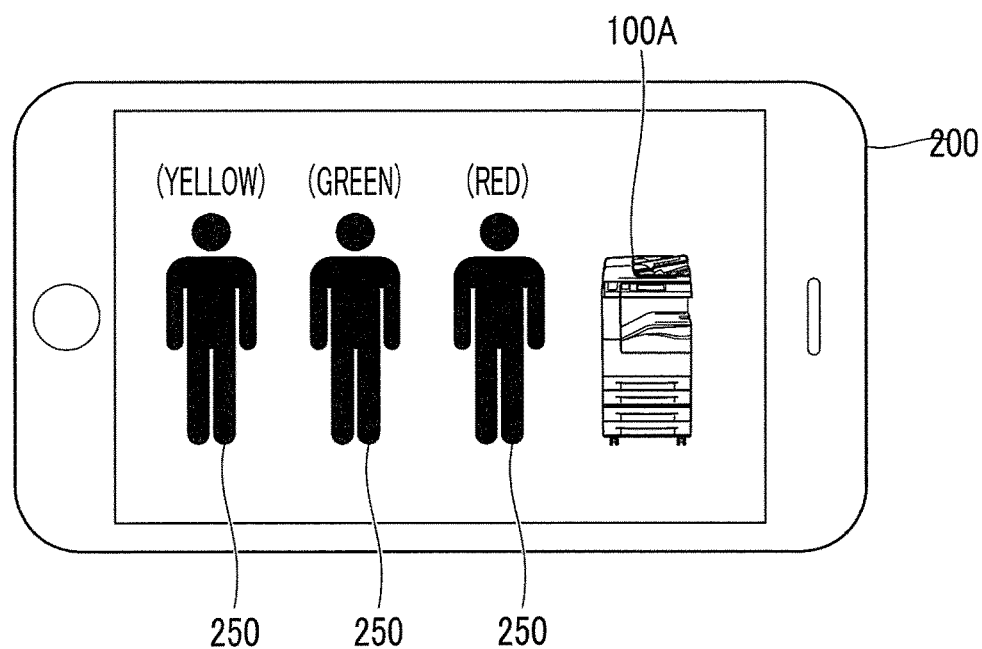

FIGS. 14A and 14B are diagrams illustrating display examples that support prediction of waiting time. FIG. 14A is an example of displaying the expected time of work (waiting time) by the height of the icon 250, and FIG. 14B is an example of expressing the expected time of work (waiting time) by color.

In the example of FIG. 14A, it is visually understood that the expected time of work (waiting time) for the person at the head of the waiting queue is long, the expected time of work (waiting time) for the second person is short, and the expected time of work (waiting time) for the third person is medium.

The height of the icon 250 may be expressed with reference to the length in the height direction of the touch panel 215 (see FIG. 4).

In the example of FIG. 14B, it is visually understood that the expected time of work (waiting time) for the first person whose icon 250 is expressed in red is long, the expected time of work (waiting time) for the second person whose icon 250 is expressed in green is short, and the expected time of work (waiting time) for the third person whose icon 250 is expressed in yellow is medium.

The Display Example 4 is also used for checking the number of waiting people by users who are considering the use of the image forming apparatus from this and users who have already joined a waiting list.

Display Example 5

Figure 15:
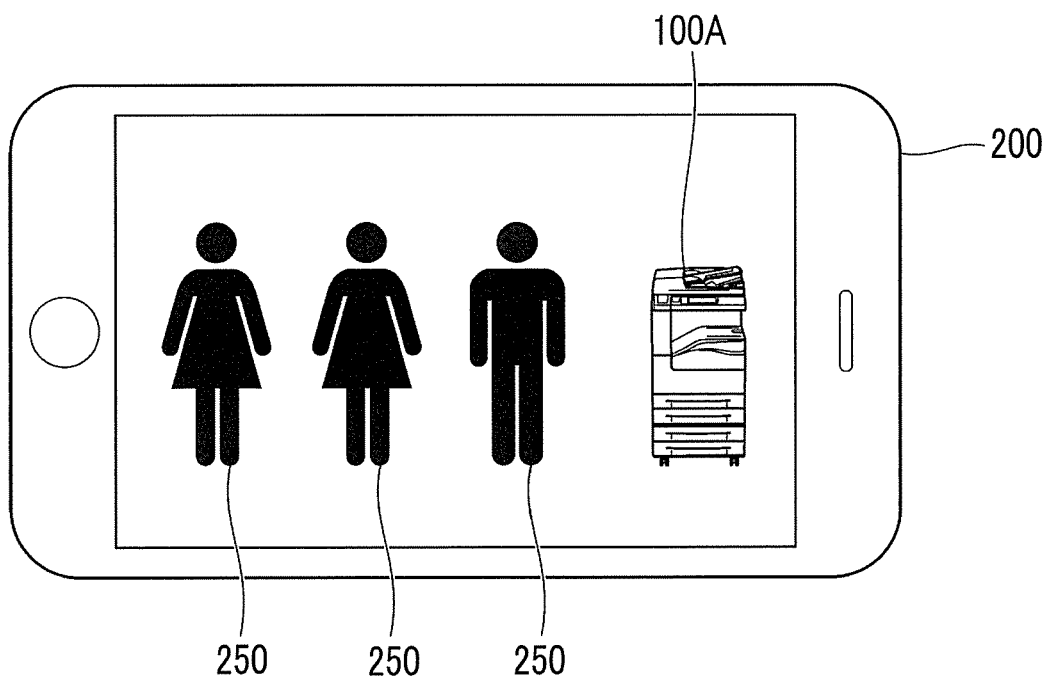
FIG. 15 is a diagram illustrating an example in which gender of a waiting person is displayed.

FIG. 15 is a diagram illustrating an example in which the gender of a waiting person is displayed.

In the case of FIG. 15, since the person at the head of the waiting queue is a male, the icon 250 representing a male is displayed, and since the people located at the second and third of the waiting order are female, icons 250 representing a female is displayed.

This display may be displayed, for example, by an operation from the smartphone 200 side. However, some people may not want to display gender. For users who do not want to display gender, icons 250 that do not distinguish between genders may be displayed or male icons may be displayed.

The Display Example 5 is also used for checking the number of waiting people by users who are considering the use of the image forming apparatus from this and users who have already joined a waiting list.

Display Example 6

Figure 16:
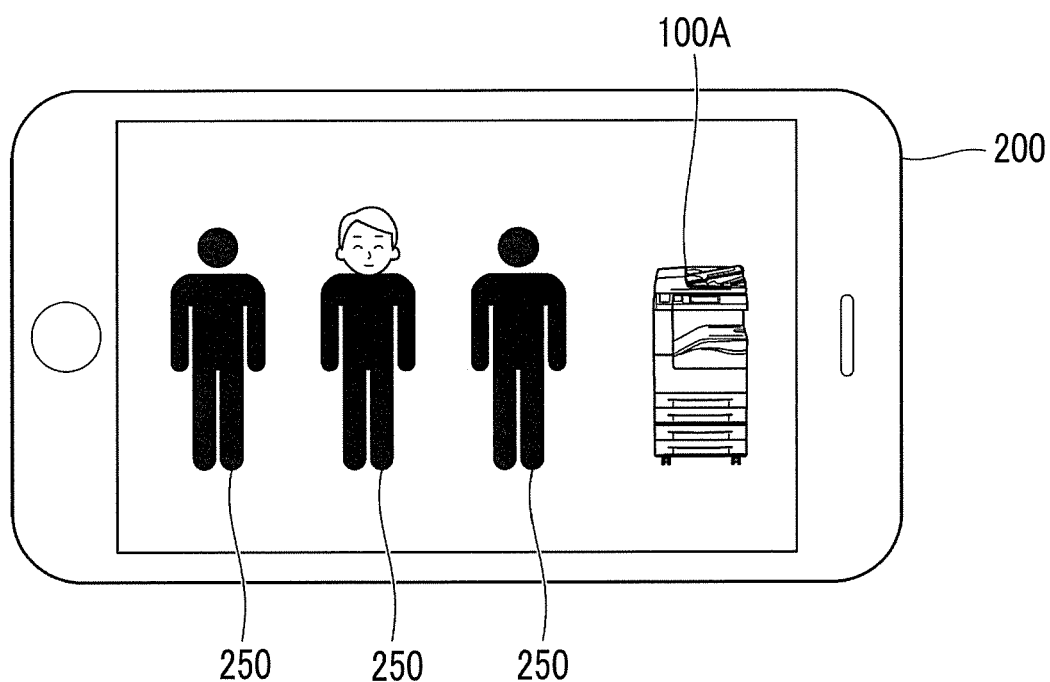
FIG. 16 is a diagram illustrating an example of a display for facilitating checking an order.

FIG. 16 is a diagram illustrating an example of a display for facilitating the checking of the order of its own.

In the case of FIG. 16, only the second icon 250 is pasted with his/her face picture registered in advance.

A face picture is an example of information for distinguishing between the user and another user. Pasting of a face picture may be executed in the smartphone 200 operated by the user, or may be executed inside the icon distribution server 300 (see FIG. 1).

The user whose face picture is displayed in FIG. 16 is limited to the user who has already joined a waiting list (including the user who is using the image forming apparatus).

In addition, the icon distribution server 300 may paste and distribute face pictures registered in advance to the icons 250 of all the waiting people.

However, the distribution destination of the icon 250 to which the face picture is pasted may be set by the user. For example, the distribution destination of the icon 250 to which the face picture is pasted may be limited to the user.

Further, even in a case where some users allow their face pictures to be notified to other users, the user may limit the face picture displayed on his or her smartphone 200 to his or her own face picture.

It may be replaced with a user-dedicated icon or the user's picture which has been generated relating to the entire body as well as the head of the icon 250 and registered in advance.

Further, since the face picture of the user who is waiting is displayed, the user is able to easily check his or her order.

Further, as shown in FIG. 16, a person waiting after the user is also displayed on the screen, so that the user is able to easily predict his or her turn in the case of canceling the waiting or giving his or her turn to another person.

Display Example 7

Figure 17:
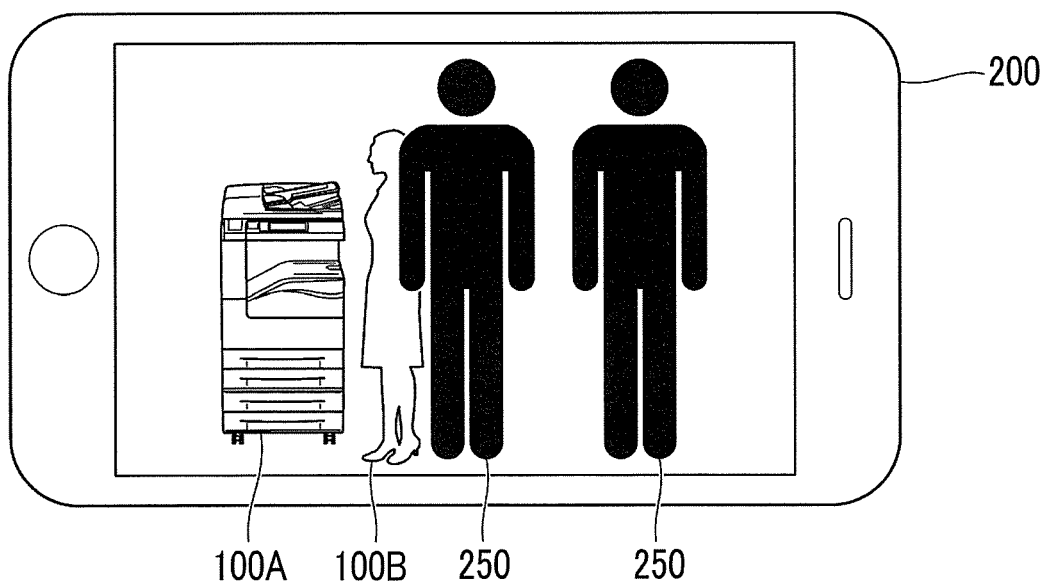
FIG. 17 is a diagram for explaining a display example of icons in a case where there is a real person on the side of the image forming apparatus.

FIG. 17 is a diagram for explaining a display example of icons 250 in a case where there is a real person on the side of the image forming apparatus 100 (see FIG. 1).

In the case of FIG. 17, an image 100B of a person existing on the side of the image 100A of the image forming apparatus and two icons 250 are displayed.

In the case where the dimension of the icon 250 is substantially equal to the dimension of the image 100B of the actual person, it is difficult to distinguish from the image 100B of the actual person depending on the display form of the icon 250. Further, it is difficult to check the icon 250.

Therefore, in the case of FIG. 17, the icon 250 is displayed so as to be distinguishable from the image 100B of the actual person. Specifically, the height (stature) of the icon 250 is adjusted to be higher than the image 100E of the actual person. Preferably, for example, the head of the icon 250 is displayed above the head of the person's image 100B.

In a case where the height of the icon 250 is displayed higher than the image 100B of the actual person, even in a case where the image 100B of the actual person and the icon 250 are displayed to overlap, the number of people of the icons 250 may be easily checked.

Figure 18:
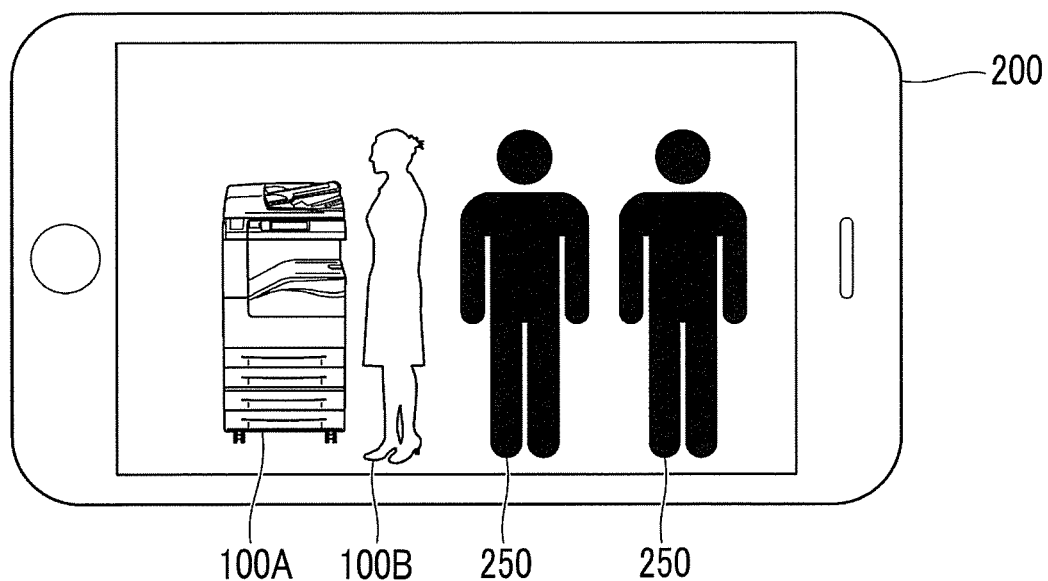
FIG. 18 is a diagram for explaining another display example of icons in a case where there is a real person on the side of the image forming apparatus.

FIG. 18 is a diagram for explaining another display example of icons 250 in a case where there is a real person on the side of the image forming apparatus 100 (see FIG. 1).

In the case of FIG. 18, the height of the icon 250 is about the same as that of the actual person's image 100B. However, the icon 250 is displayed so as not to overlap the image of the actual person 100B. In this manner, since the icon 250 does not overlap the image 100B of the actual person, it becomes easy to check the number of people of the icons 250.

The Display Example 7 is also used for checking the number of waiting people by users who are considering the use of the image forming apparatus from this and users who have already joined a waiting list.

Display Example 8

Figure 19:
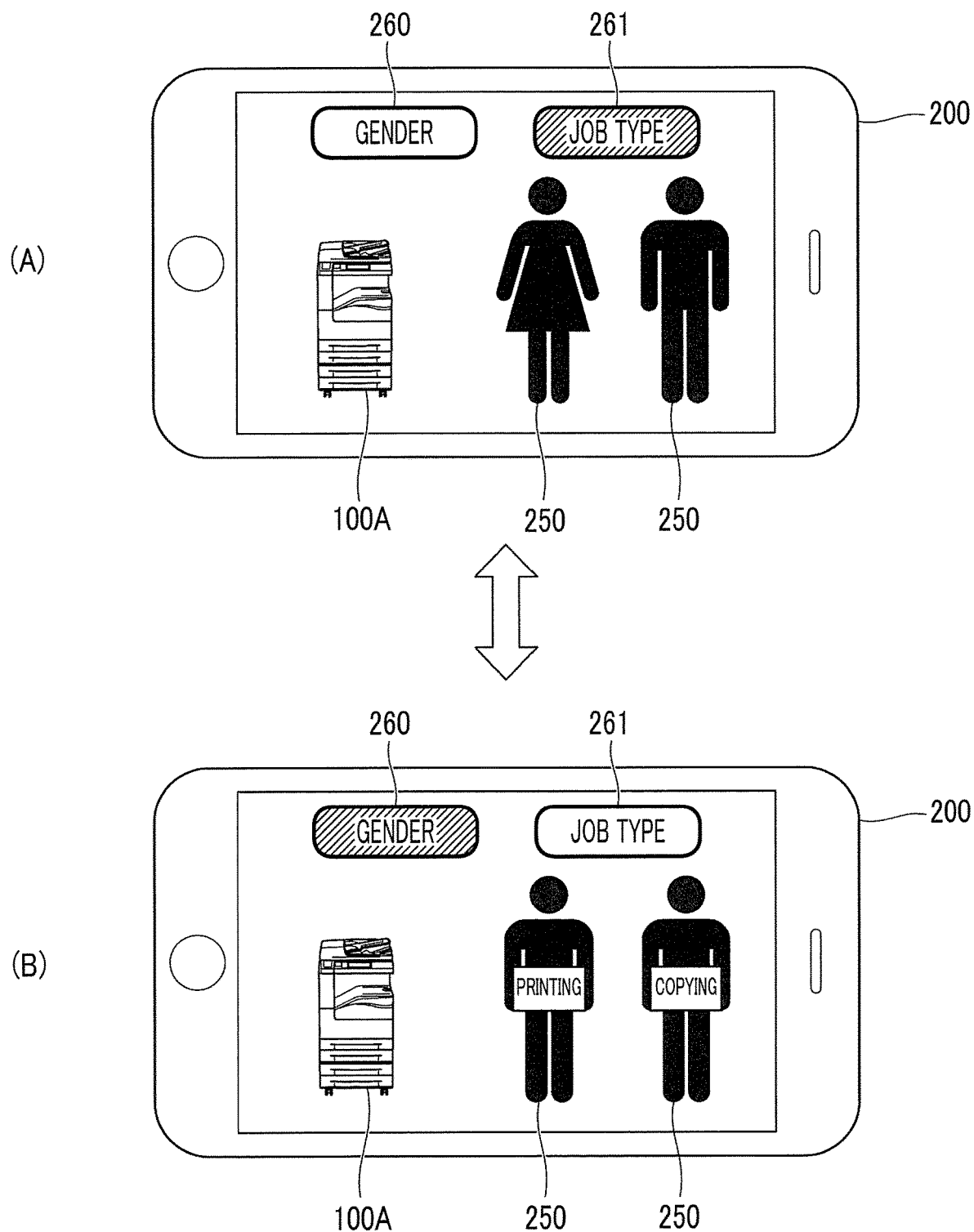
FIG. 19 is a diagram for explaining an example in which icon display is switched by a user's operation. A part (A) in FIG. 19 illustrates a case where display of gender is selected, and a part (B) in FIG. 19 illustrates a case where display of job type is selected.

FIG. 19 is a diagram for explaining an example in which icon 250 display is switched by a user's operation. A part (A) in FIG. 19 illustrates a case where display of gender is selected, and a part (B) in FIG. 19 illustrates a case where display of job type is selected.

In the case of FIG. 19, on the screen of the touch panel 215 (see FIG. 4), a gender display button 260 and a job type display button 261 are prepared.

In the example of the part (A) in FIG. 19, the gender display button 260 is selected. Therefore, the icon 250 located at the head of the waiting queue is displayed in a form representing a female, and the icon 250 located at the second position is displayed in a form representing a male.

In the example of the part (B) of FIG. 19, the job type display button 261 is selected. Therefore, a note indicating that the job type is printing is described in the icon 250 located at the head of the waiting queue, and a note indicating that the job type is copying is described in the icon 250 located at the second position.

With this function, the user is able to know the information that he or she wants to know through the display of the icon 250.

In addition, the selection buttons are not limited to the gender display button 260 and the job type display button 261. For example, a button for expressing a waiting time, a button for displaying user's face picture, or the like may be prepared.

The Display Example 8 is also used for checking the number of waiting people by users who are considering the use of the image forming apparatus from this and users who have already joined a waiting list.

Display Example 9

Figure 20A:
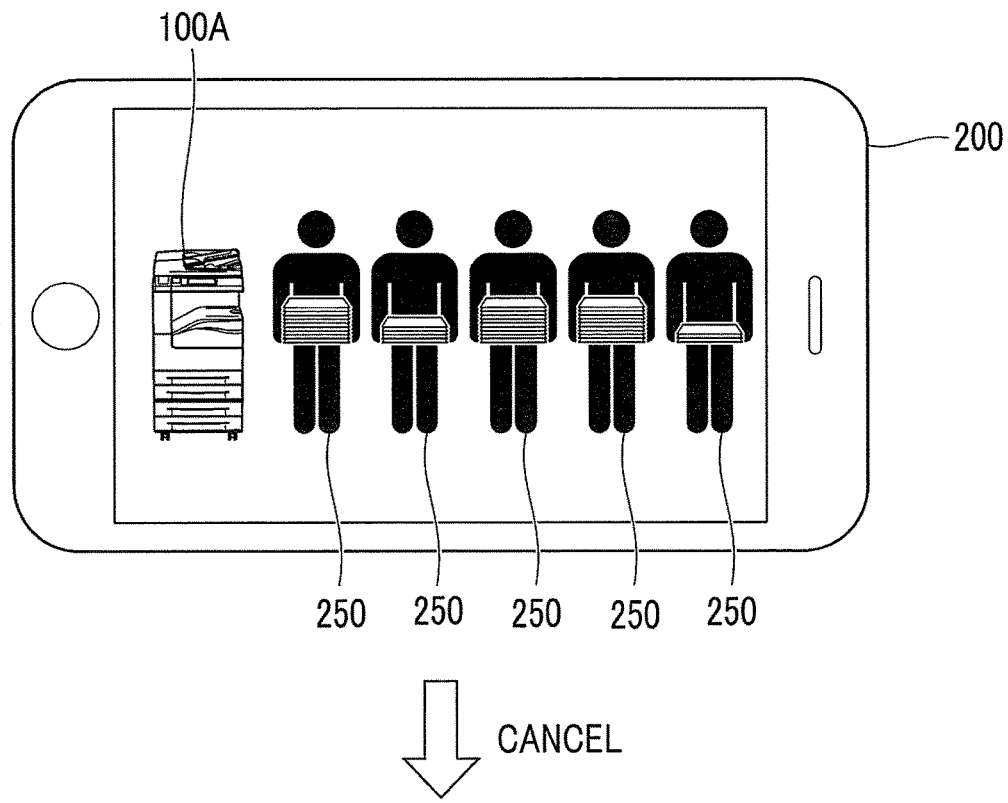
FIG. 20A and FIG. 20B are diagrams for explaining display examples in a case where there is cancellation of waiting.
Figure 20B:
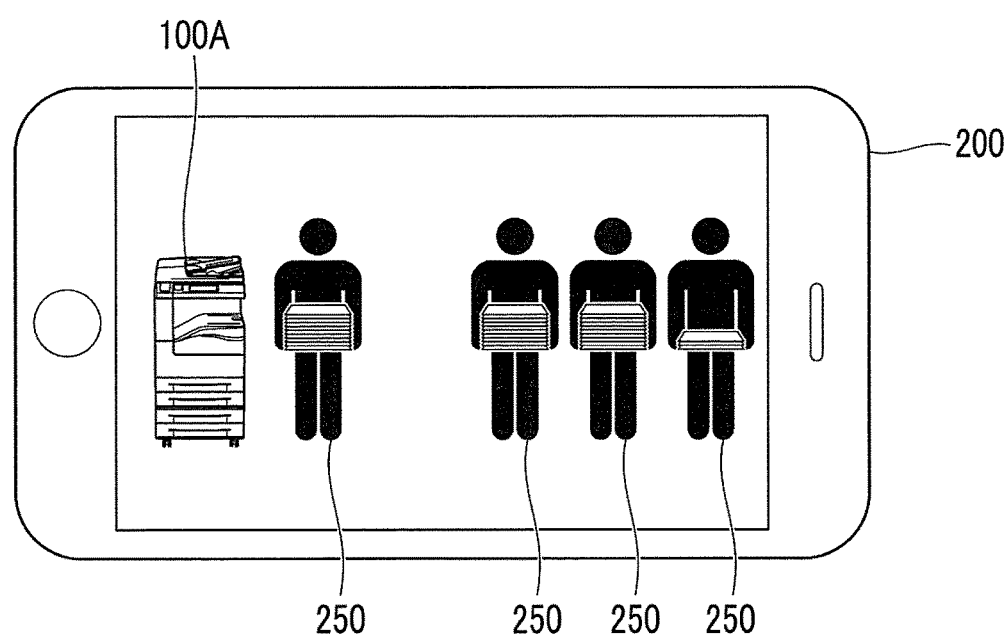

FIG. 20 is a diagram for explaining display examples in a case where there is cancellation of waiting. A part (A) is a display before cancellation and a part (B) is a display after cancellation.

In the part (A), icons 250 for five people are displayed in a row, and the thickness of the bundle of sheets of each icon 250 expresses the waiting time.

Here, the case where the second user waiting in order cancels waiting is expressed.

Therefore, in the display of the part (B), the second icon 250 disappears. That is, there is a gap for one person. Since the icon 250 at the position of the canceled person disappears in this manner, the user is able to understand that there is cancellation.

The icon 250 at the canceled position may be displayed by blinking. Further, only the icon 250 at the canceled position may be changed to display with contour or translucent. In addition, the icon 250 at the canceled position may be expressed in a darker color or a lighter color than the other icons 250. However, the position in the row may simply be filled.

FIG. 21 is a diagram for explaining other display examples in a case where there is cancellation of waiting. A part (A) is a display before cancellation and a part (B) is a display after cancellation.

In the case of FIG. 21, the icon 250 at the canceled position is displayed on the ground side like a shadow. By changing to a form of display different from other displays, it is possible to notify the user that there is cancellation.

The Display Example 9 is also used for checking the number of waiting people by users who are considering the use of the image forming apparatus from this and users who have already joined a waiting list. However, users who continuously check changes in the number of waiting people are considered to be users who have already joined a waiting list in many cases.

Other Usage Examples

In the example of FIG. 1, although the smartphone 200 is supported with both hands to capture the image forming apparatus 100, it may be attached to the goggle and used on the head.

Figure 22:
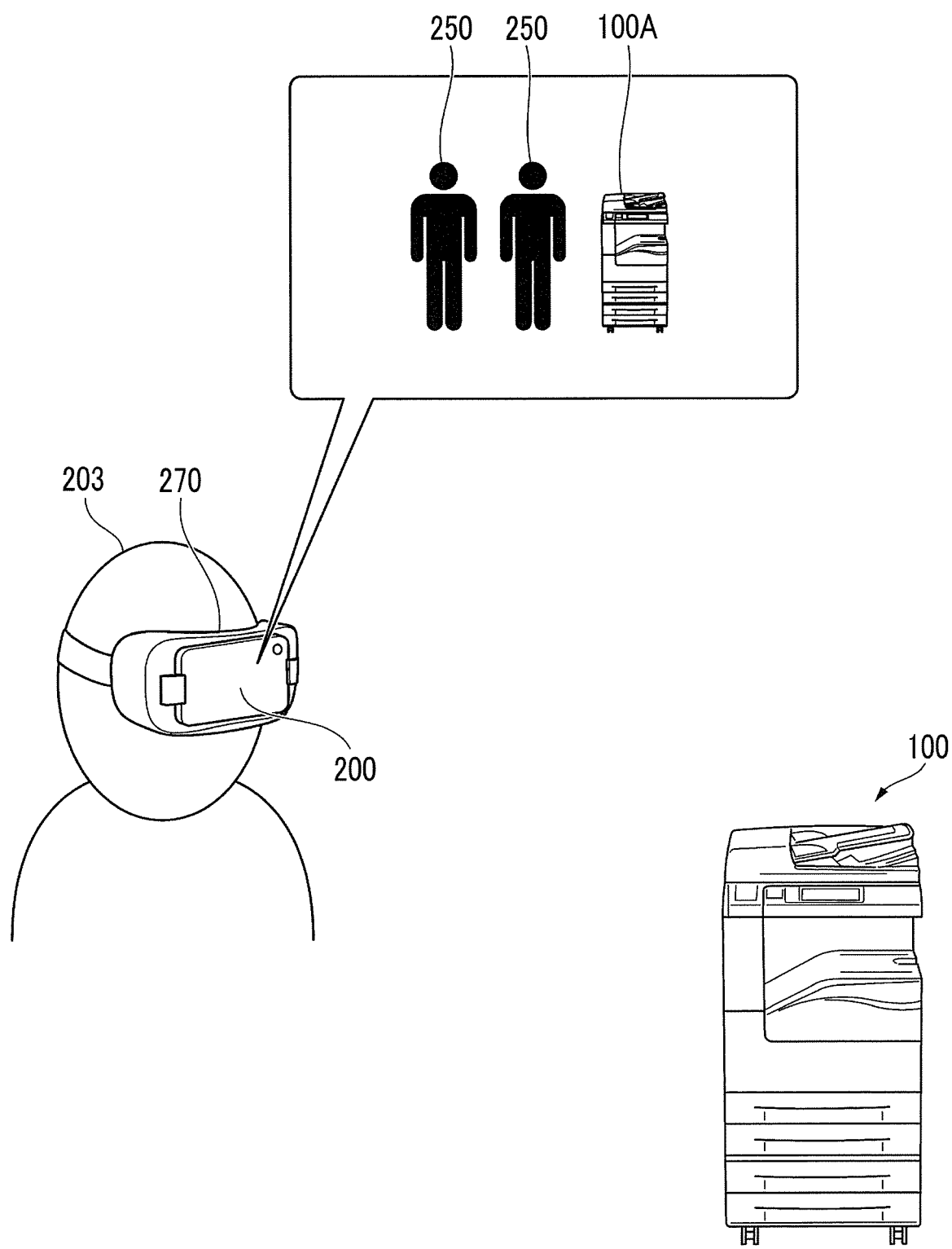
FIG. 22 is a diagram for explaining an example of use in which a goggle with a smartphone attached thereto is worn on the head of a user.

FIG. 22 is a diagram for explaining an example of use in which a goggle 270 with a smartphone 200 attached thereto is worn on the head 203 of a user.

Except for attaching the smartphone 200 to the goggle 270, the explanation of FIG. 22 is the same as that of FIG. 1 in which the smartphone 200 is supported with both hands.

Exemplary Embodiment 2

FIG. 23 is a diagram for explaining a case of using a technique called augmented reality or mixed reality.

In the case of FIG. 23, the user wears the transmissive eyeglass-type terminal 400 on the head 203.

The eyeglass-type terminal 400 shown in FIG. 23 has a configuration in which optical elements with high transparency are disposed in the parts of the user's eyes in a case of wearing it. The eyeglass-type terminal 400 is an example of a transparent member disposed in front of the user's eyes.

Therefore, the user wearing the eyeglass-type terminal 400 is able to directly visually recognize the image forming apparatus 100 in the real space through the optical elements with high transparency.

Figure 24:
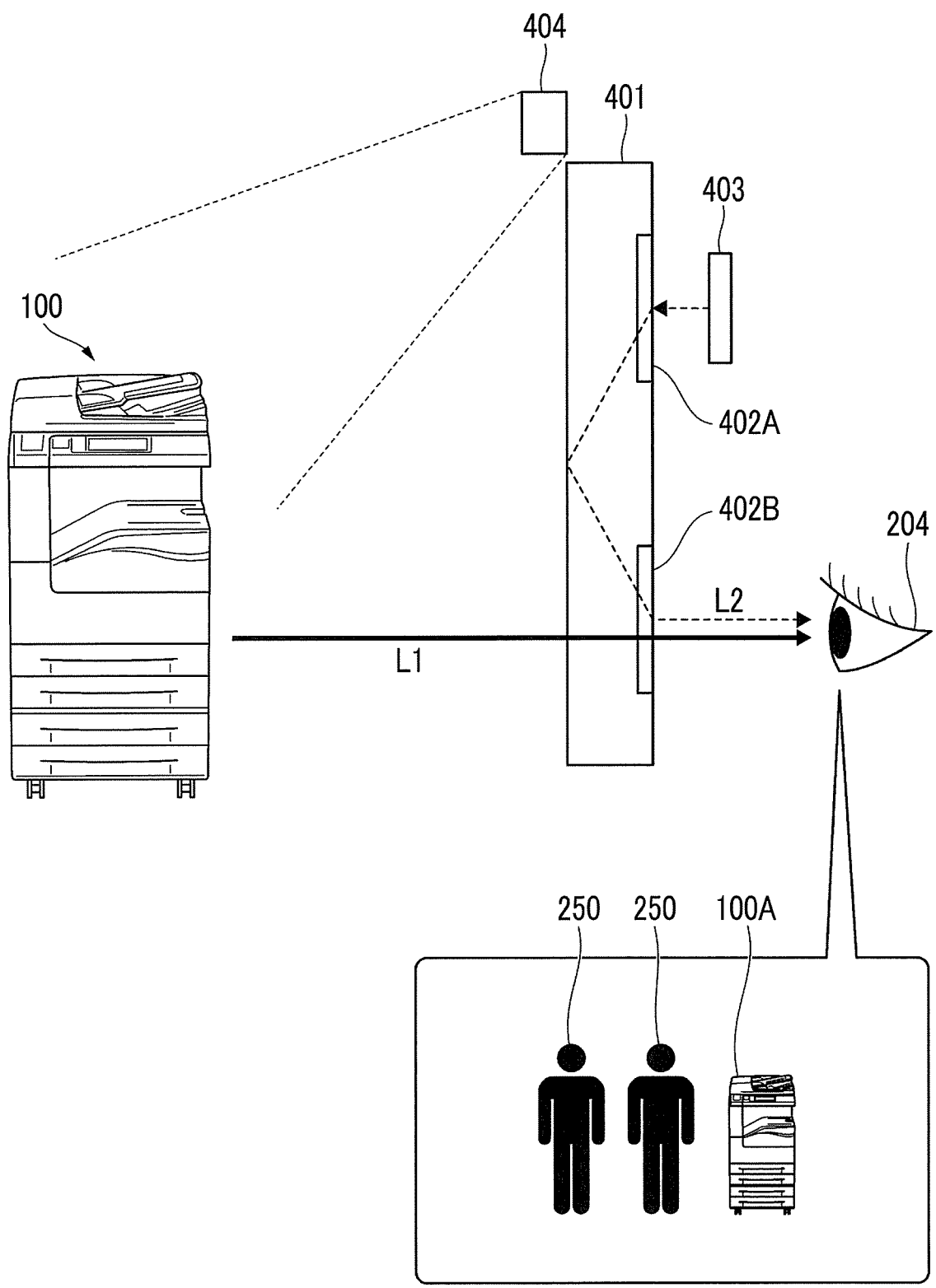
FIG. 24 is a diagram for explaining an example of a structure of an eyeglass-type terminal used in Exemplary Embodiment 2.

FIG. 24 is a diagram for explaining an example of a structure of an eyeglass-type terminal 400 used in Exemplary Embodiment 2.

This type of eyeglass-type terminal 400 has already been practically used by plural manufacturers. This type of eyeglass-type terminal 400 is also called a transmission type device, a retinal projection type device, or the like.

The eyeglass-type terminal 400 shown in FIG. 24 includes a light guide plate 401 with high transparency, visible light transmission type diffraction gratings 402A and 402B, a small display section 403 on which icons 250 and the like are displayed, a camera 404 for capturing the front of the user.

The light guide plate 401 has transparency of 85% or more, for example. Therefore, the user is able to visually recognize directly foreground scenery through the light guide plate 401. The light guide plate 401 is an example of a transparent member.

In FIG. 24, external light L1 reflected by the image forming apparatus 100 travels straight so as to pass through the light guide plate 401 and the visible light transmission type diffraction grating 402B and is guided to the eyeball 204. Further, the visible light transmission type diffraction grating 402B has a flat plate shape and is disposed in front of the eyeball 204.

Here, the visible light transmission type diffraction grating 402B also functions to refract the light L2 (light corresponding to the icon 250) propagating while being reflected in the inside of the light guide plate 401 toward the eyeball 204.

The light L2 is a light ray after being projected from the display section 403 onto the light guide plate 401 and then refracted by the visible light transmission type diffraction grating 402A.

Further, for example, holographic diffraction gratings are used for the visible light transmission type diffraction gratings 402A and 402B. The visible light transmission type diffraction grating 402B functions as a so-called half mirror. Therefore, in the eyeball 204, the icon 250, which is a virtual image, appears to overlap the image forming apparatus 100 which is a real image. Further, the icon 250 is displayed on the display section 403 such as a liquid crystal display.

Configuration of Eyeglass-Type Terminal 400

Figure 25:
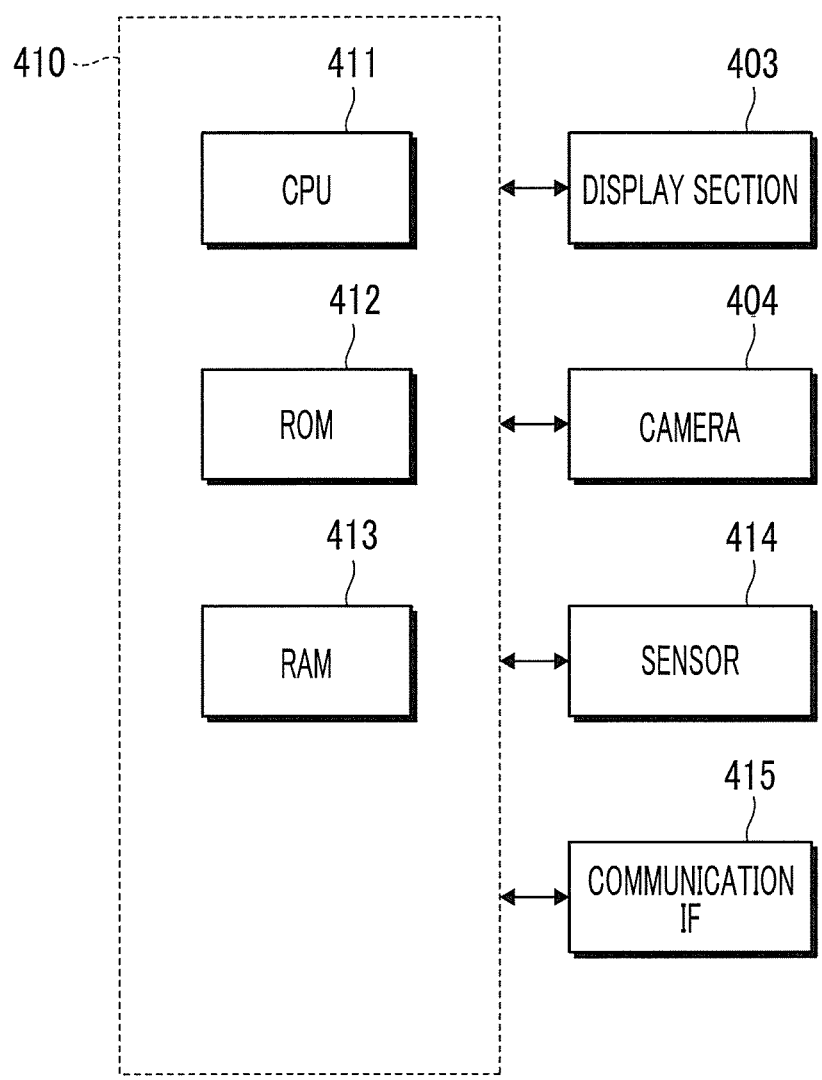
FIG. 25 is a diagram illustrating an example of a hardware configuration of the eyeglass-type terminal used in Exemplary Embodiment 2.

FIG. 25 is a diagram illustrating an example of a hardware configuration of the eyeglass-type terminal 400 used in Exemplary Embodiment 2.

In FIG. 25, parts corresponding to those in FIG. 2 are denoted by the corresponding reference numerals.

The eyeglass-type terminal 400 includes a central processing unit (CPU) 411 that controls the entire apparatus by executing a program (including firmware), a ROM 412 that stores programs such as a basic input output system (BIOS) and firmware, a random access memory (RAM) 413 used as a program execution area.

The CPU 411, the ROM 412, and the RAM 413 function as the computer 410.

A display section 403 for displaying the icon 250 (see FIG. 24), a camera 404 for capturing the outside world, a sensor 414 for detecting various physical quantities, and a communication interface (communication IF) 415 used for communication with the outside are connected to the computer 410.

Examples of the sensor 414 include a gyro sensor for detecting the inclination, a distance sensor for detecting the distance to the object, a global positioning system (GPS) sensor for detecting the position of the eyeglass-type terminal 400, a visual line detection sensor, and the like.

Figure 26:
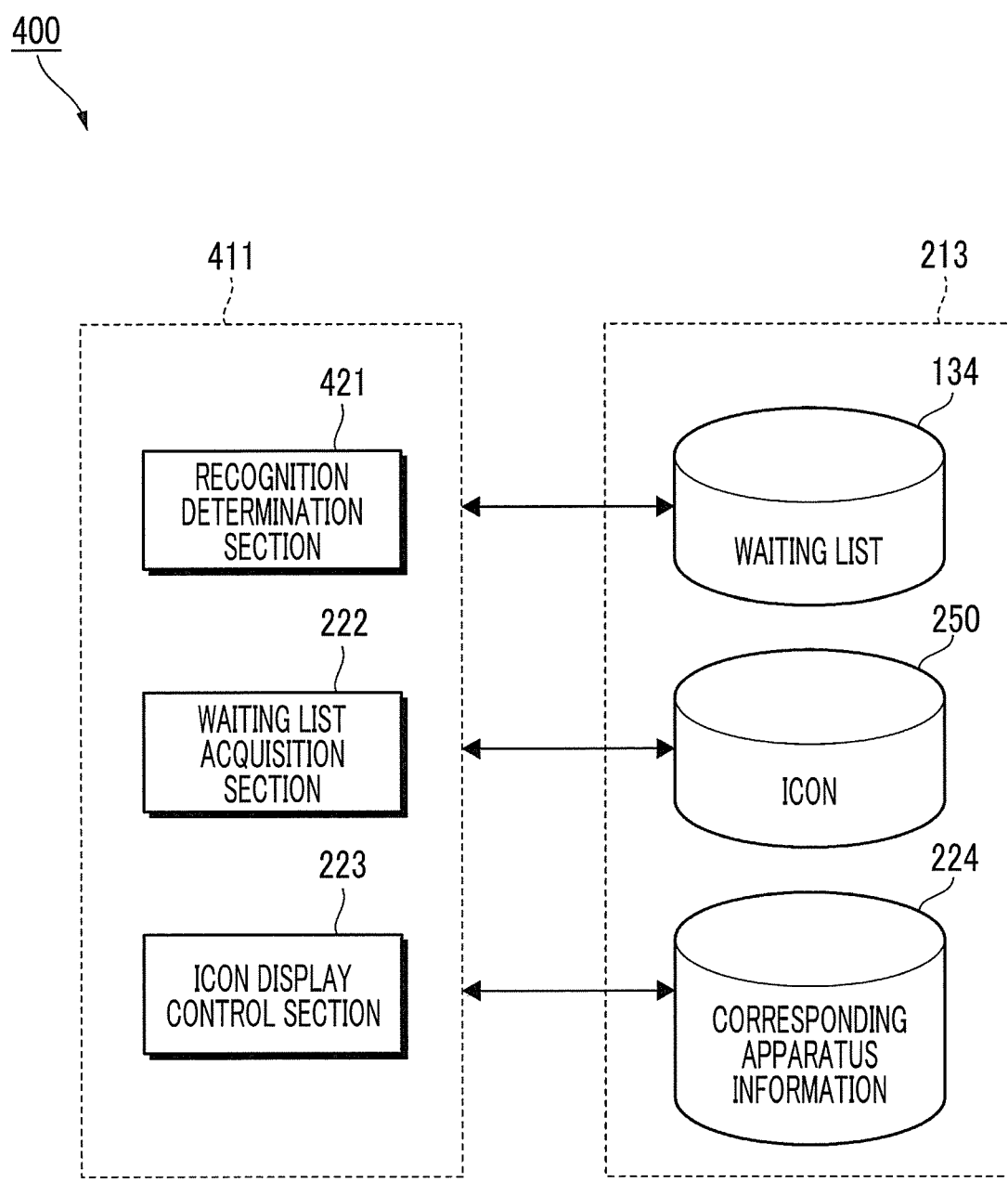
FIG. 26 is a diagram illustrating an example of a functional configuration of the eyeglass-type terminal used in Exemplary Embodiment 2.

FIG. 26 is a diagram illustrating an example of a functional configuration of the eyeglass-type terminal 400 used in Exemplary Embodiment 2.

In FIG. 26, parts corresponding to those in FIG. 5 are denoted by the corresponding reference numerals.

The functions shown in FIG. 26 are realized by the CPU 411 executing a program.

Further, FIG. 26 illustrates functions related to a service for notifying the number of waiting people, among the functions realized through the execution of the program.

In the case of the present exemplary embodiment, the eyeglass-type terminal 400 functions as a recognition determination section 421 that determines whether or not an apparatus corresponding to the service for notifying the number of waiting people has been recognized, a waiting list acquisition section 222 that manages the waiting list 134, and an icon display control section 223 that displays the icon 250 so as to be superimposed on the outside world visually recognized through the light guide plate 401.

The recognition determination section 421 in the present exemplary embodiment specifies an object in the outside world which the user visually recognizes, for example, based on the image captured by the camera 404 and the output of the sensor 414 (for example, a gyro sensor, a visual line detection sensor), and determines whether the specified object is an apparatus or a place corresponding to the service for notifying the number of waiting people.

In the present exemplary embodiment, the image corresponding to the icon 250 is guided to both eyes, but a terminal of a type that guides the image corresponding to the icon 250 to either the left eye or the right eye may be used.

Exemplary Embodiment 3

FIG. 27 is a diagram for explaining a display example of icons 250 in a case of capturing an entrance 501 of a restaurant 500 with the smartphone 200.

In the case of FIG. 27, the object to be captured by the smartphone 200 is not the image forming apparatus 100, but the entrance 501 of the restaurant 500 is captured.

The place where a food service is provided is in the restaurant 500, but in the case of the present exemplary embodiment, the food service is managed in association with the entrance 501 of the restaurant 500. The entrance 501 of the restaurant 500 is an example of a real place managed in association with a service.

Therefore, in a case where the smartphone 200 detects the capturing of the entrance 501 of the restaurant 500, the smartphone 200 determines that the restaurant 500 is likely to be visually recognized by the user, and determines that the restaurant 500 has been recognized.

In FIG. 27, icons 250 of the number of waiting people from the position of the image 501A of the entrance of the image 500A of the restaurant are displayed. In the case of FIG. 27, since the number of waiting people is large and the row is long, the row displayed on the screen is curved.

Incidentally, in the case where the restaurant 500 is used, it is often used for groups such as families or couples.

FIG. 28 is a diagram for explaining another display example of icons 250 in a case of capturing the entrance 501 of the restaurant 500 with the smartphone 200.

In FIG. 28, waiting users are expressed in units of groups such as families or couples.

In FIG. 28, four groups are expressed.

In addition, in FIG. 28, adults and children are distinctively expressed. Since families require seats for many people, it is easy to predict that the order of the user who uses two seats may become earlier.

Further, in the present exemplary embodiment, a restaurant has been exemplified as an example in which a waiting notification service is managed in association with a real place. However, for example, application of a waiting notification service to a hospital, a government office, a financial institution, a post office, or the like is also envisioned.

For example, in the case of a hospital, the age, symptom, presence or absence of consultation, request for prescription only, or the like may be reflected on the expression of the icon 250 based on the information input at the time of reservation for waiting. In addition, in the representation of the icon 250, motions such as getting fever, coughing and sneezing may be combined based on the information entered at the time of reservation for waiting. Motion may be displayed as a moving picture like animation. With these supplementary information, it is possible to improve the accuracy of waiting time prediction.

Further, in the case where there are plural windows, a row of icons 250 may be displayed for each window (for example, for each medical department, procedure type).

Exemplary Embodiment 4

In the above-described Exemplary Embodiment 1, the recognition determination section 221 (see FIG. 5) provided in the smartphone 200 detects whether or not an actual apparatus (for example, the image forming apparatus 100 (see FIG. 1)) managed in association with the service has been recognized by the user. However, in the present exemplary embodiment, a case where a recognition determination section 221 that detects whether or not the image forming apparatus 100 associated with the service has been recognized by the user is provided will be described.

Here, the recognition determination section 221 determines whether or not the user has recognized the apparatus, based on the detection result of the detection unit that detects the user who visually recognizes the apparatus associated with the specific service.

Figure 29:
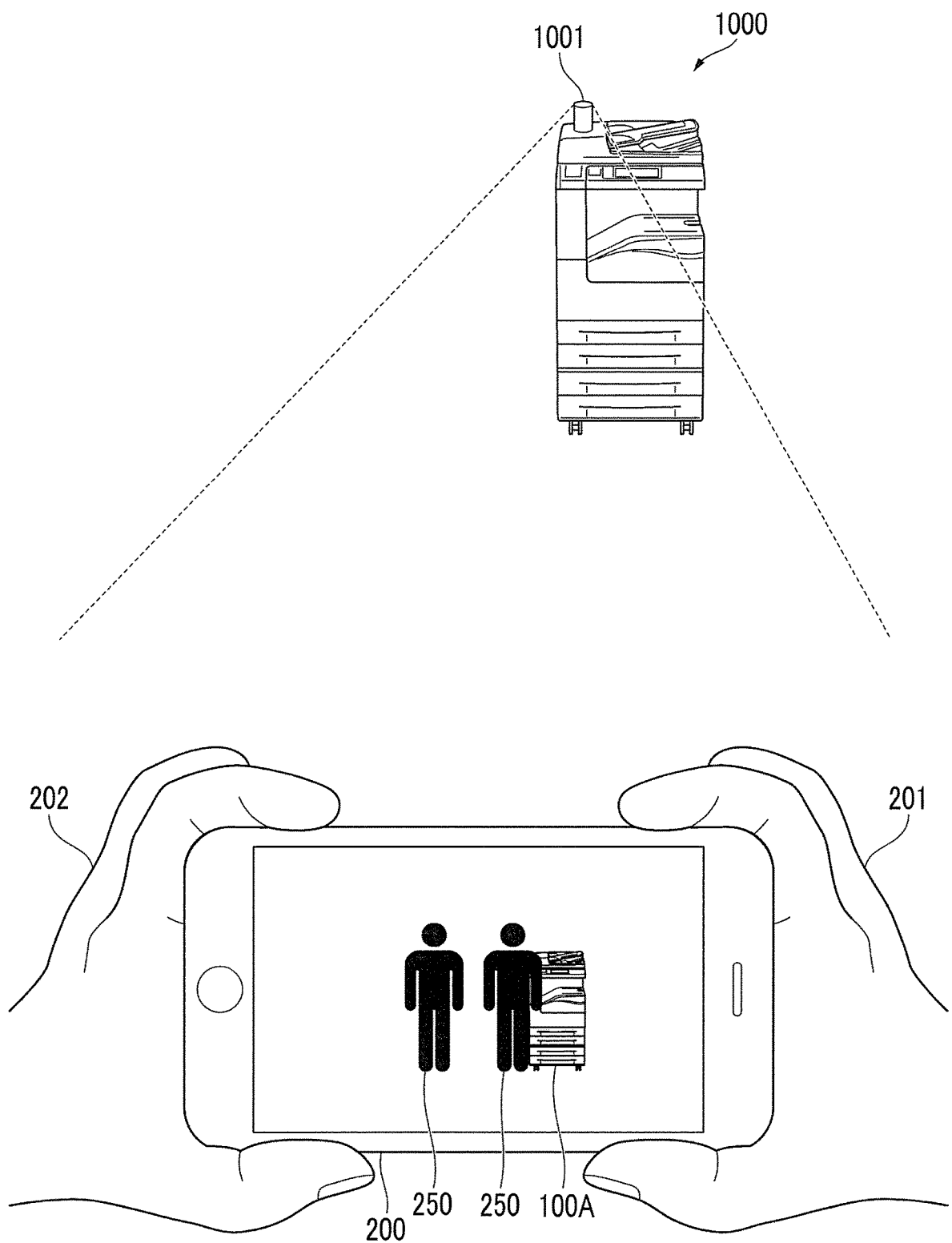
FIG. 29 is a diagram for explaining an example of an image forming apparatus having a function of detecting visual recognition by a user.

FIG. 29 is a diagram for explaining an example of an image forming apparatus 1000 having a function of detecting visual recognition by a user.

The image forming apparatus 1000 shown in FIG. 29 is provided with a peripheral camera 1001 that detects a user who is visually recognizing the apparatus in image processing.

Figure 30:
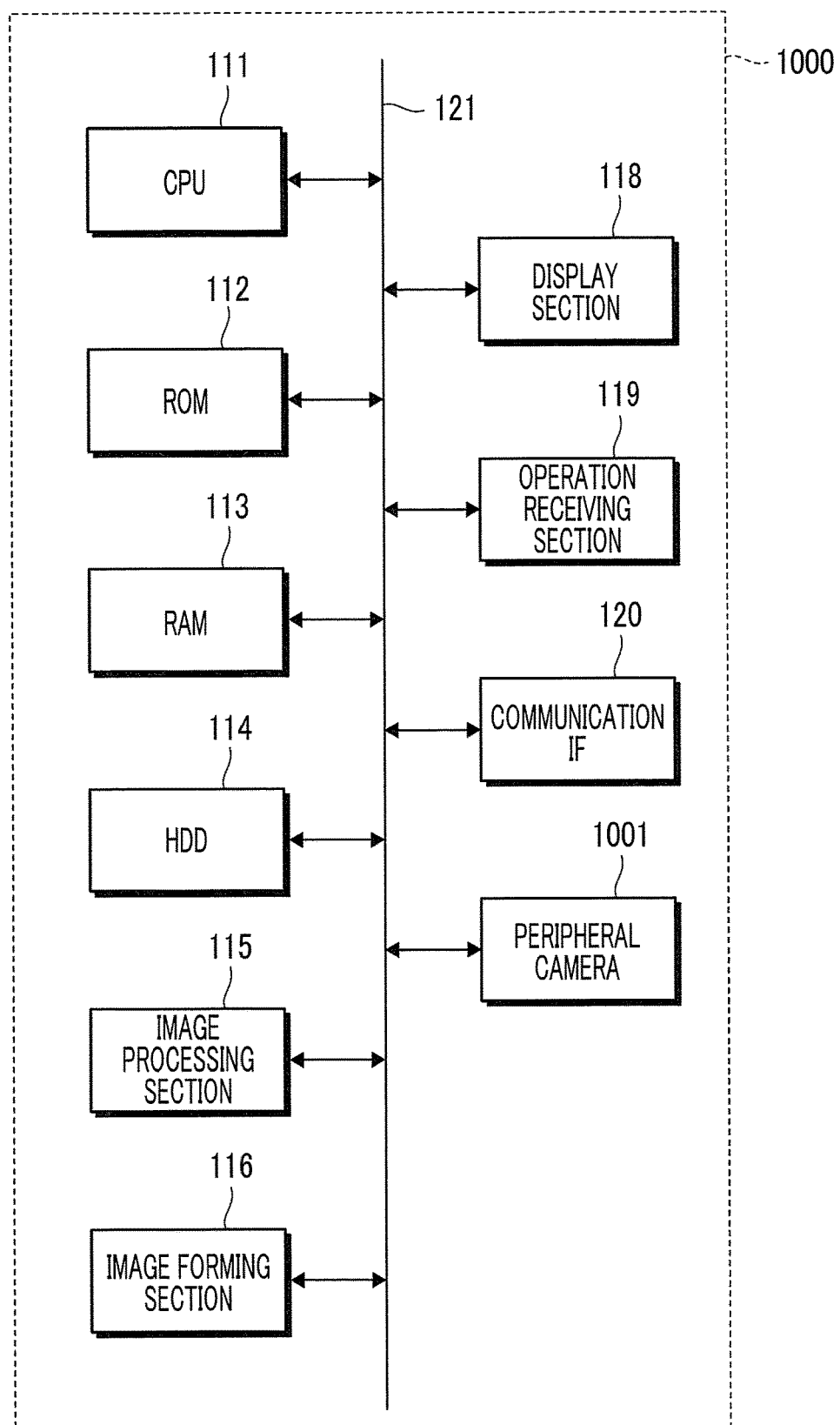
FIG. 30 is a diagram illustrating an example of a hardware configuration of an image forming apparatus according to Exemplary Embodiment 4.

FIG. 30 is a diagram illustrating an example of a hardware configuration of an image forming apparatus 1000 according to Exemplary Embodiment 4.

In FIG. 30, parts corresponding to those in FIG. 2 are denoted by the corresponding reference numerals.

FIG. 30 is different from FIG. 2 in that a peripheral camera 1001 that captures the periphery of the image forming apparatus 1000 is provided.

In the image forming apparatus 1000 shown in FIG. 30, the peripheral camera 1001 that captures the periphery is disposed.

Figure 31:
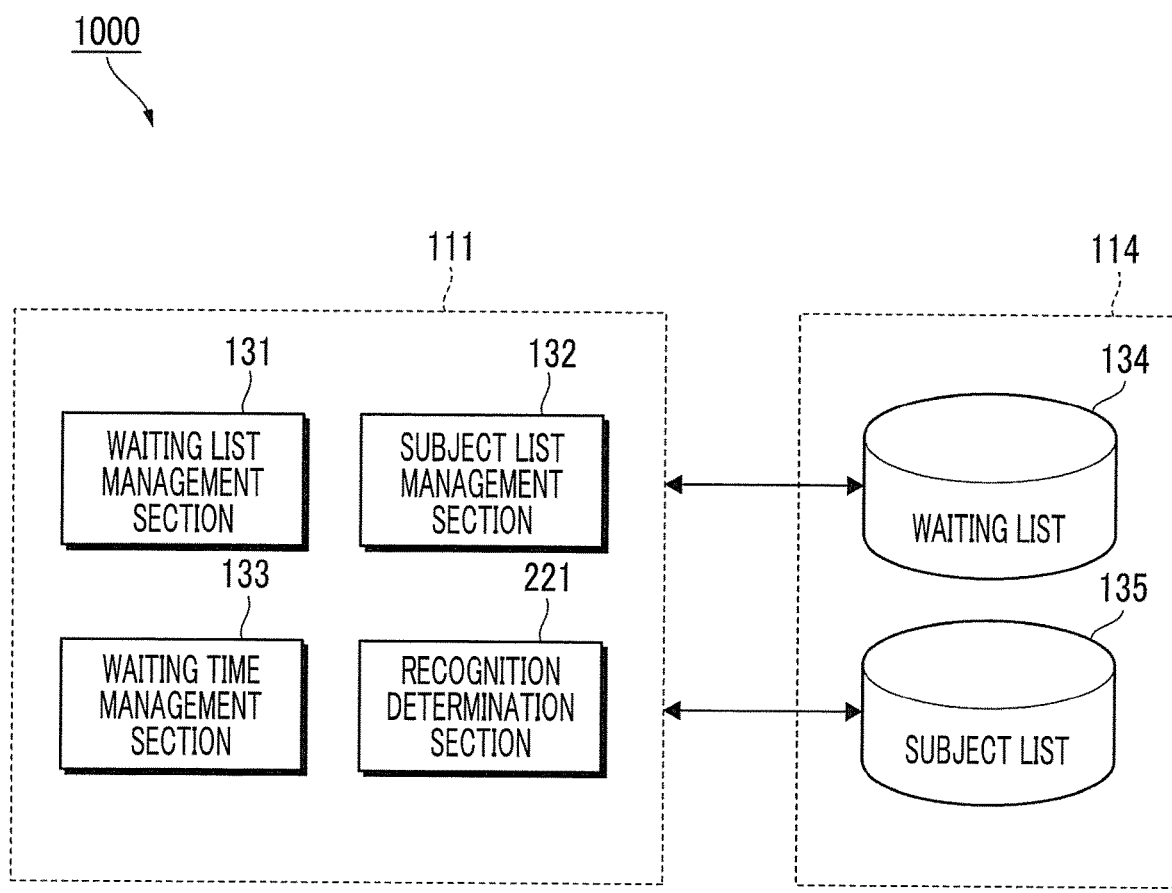
FIG. 31 is a diagram illustrating an example of a functional configuration of the image forming apparatus used in Exemplary Embodiment 4.

FIG. 31 is a diagram illustrating an example of a functional configuration of the image forming apparatus 1000 used in Exemplary Embodiment 4.

In FIG. 31, parts corresponding to those in FIG. 3 are denoted by the corresponding reference numerals.

FIG. 31 is different from FIG. 3 in that a recognition determination section 221 is provided.

The recognition determination section 221 in the present exemplary embodiment is provided with a function of detecting the presence of a user who is capturing the apparatus in the image captured by the peripheral camera 1001 or directs his or her line of sight thereto.

Figure 32:
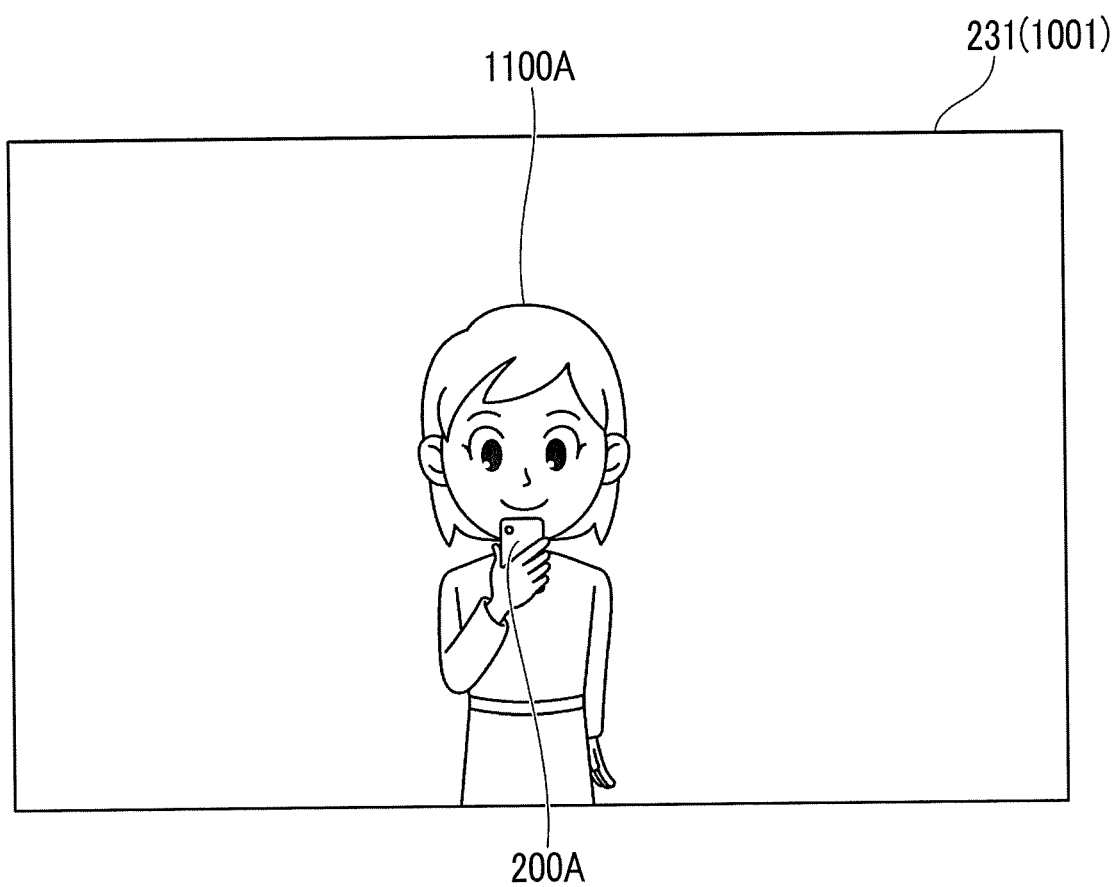
FIG. 32 is a diagram for explaining a range of an image used by a visual recognition detection section for image recognition.

FIG. 32 is a diagram for explaining a range of an image used by the recognition determination section 221 for image recognition.

In FIG. 32, a rectangular range 231 indicated by a solid line is a range in which an image captured by the peripheral camera 1001 is displayed.

In the image shown in FIG. 32, the image 1100A of the user which is the object faces the image 200A of the smartphone.

In a case where the person holding the smartphone 200 (see FIG. 1) in the position facing the apparatus is detected, the recognition determination section 221 of the image forming apparatus 1000 detects the presence of a person who is visually recognizing the apparatus.

The recognition determination section 221 in the present exemplary embodiment notifies the smartphone 200 that is capturing the apparatus of the waiting list 134. Further, the icon distribution server 300 is caused to distribute the icon 250 to the smartphone 200 that is capturing the apparatus.

The recognition determination section 221 in the present exemplary embodiment specifies the smartphone 200 that is capturing the apparatus through wireless communication. Here, the recognition determination section 221 also functions as an example of a notifying unit.

Other Exemplary Embodiments

Although the exemplary embodiments of the present invention have been described above, the technical scope of the present invention is not limited to the scope described in the above-described exemplary embodiment. It is obvious from the description of the scope of the claims that various modifications or improvements to the above-described exemplary embodiment are also included in the technical scope of the present invention.

For example, in the above-described exemplary embodiment, the image forming apparatus 100 (see FIG. 1) is captured using the smartphone 200 (see FIG. 1), but capturing may be performed using a tablet terminal.

In Exemplary Embodiment 1 described above, the icon distribution server 300 (see FIG. 1) is provided independently, but the function of distributing the icon 250 (see FIG. 1) may be included in the image forming apparatus 100. That is, the image forming apparatus 100 may be provided with the waiting list management section 131 (see FIG. 3), the icon generation section 323 (see FIG. 8) and the icon distribution section 324 (see FIG. 8).

Further, the waiting list management section 131 (see FIG. 3), the icon generation section 323 (see FIG. 8) and the icon distribution section 324 (see FIG. 8) may be provided as functions of the icon distribution server 300.

Further, the subject list management section 132 (see FIG. 3) may be disposed in the image forming apparatus 100.

Further, the above-described functions may respectively be disposed in different servers, or may be distributed and disposed in plural servers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor that is configured to:
    acquire information on waiting in line for receiving a specific service; and
    display an image of a virtual person, based on the information on waiting in line, in a case where a real place or apparatus managed in association with the specific service is visually recognized through a camera or a transparent member disposed in front of eyes of a user.

2. The information processing apparatus according to claim 1,
    wherein the image of the virtual person is displayed so as to be superimposed on the recognized place or a space in which the recognized apparatus is present.

3. The information processing apparatus according to claim 2,
    wherein the processor is further configured to form an image in which the image of the virtual person is superimposed on an image obtained by capturing the place or the apparatus, and display the formed image on a display unit.

4. The information processing apparatus according to claim 2,
    wherein in a case where information regarded as direct or indirect visual recognition of the place or the apparatus is detected, the processor is further configured to determine that the real place or apparatus is recognized, and displays the image of the virtual person.

5. The information processing apparatus according to claim 2,
    wherein the image of the virtual person is displayed on a front side of the place or the apparatus, based on a position of the user.

6. The information processing apparatus according to claim 1,
wherein the processor is further configured to project the image of the virtual person through a transparent member disposed in front of eyes of a user, and the user is capable of recognizing the place or the apparatus through the transparent member.

7. The information processing apparatus according to claim 1,
wherein information on a required time for the specific service to be provided or the number of users using the service is added to a display of the image of the virtual person.

8. The information processing apparatus according to claim 7,
wherein a display relating to a required time for the specific service to be provided for each group of receiving the service or the number of users using the service is added to the display of the image of the virtual person.

9. The information processing apparatus according to claim 1,
wherein information on an attribute of a waiting person is reflected in a display of the image of the virtual person.

10. The information processing apparatus according to claim 9,
wherein a display of the image of each person includes information on age and gender.

11. The information processing apparatus according to claim 1, wherein the processor is further configured to:
receive an instruction to wait, from a user, and
display the image of the virtual person including images representing other waiting users and the user, as the image of the virtual person, to the received user.

12. The information processing apparatus according to claim 11,
wherein the image of the virtual person is displayed so as to be distinguishable from an actual person.

13. The information processing apparatus according to claim 12,
wherein the image of the virtual person is displayed while avoiding a position of the actual person.

14. The information processing apparatus according to claim 1,
wherein the processor is further configured to display a confirmation screen for confirming an intention to wait, update information on waiting in response to an input on the confirmation screen, and display the updated result.

15. An information processing apparatus comprising:
a first camera that detects a user who visually recognizes an apparatus of the user associated with a specific service through a second camera or a transparent member disposed in front of eyes of the user; and
a processor that is configured to:
acquire information on waiting in line for receiving the specific service; and
notify a terminal associated with the user of the information on waiting in line.

16. The information processing apparatus according to claim 15,
wherein the information on waiting includes information related to provision of the specific service.

17. The information processing apparatus according to claim 16,
wherein the information on waiting is notified when the information is updated.

18. A non-transitory computer readable medium storing a program causing a processor which a computer comprises to:
acquire information on waiting in line for receiving a specific service; and
display an image of a virtual person, based on the information on waiting in line, in a case where a real place or apparatus managed in association with the specific service is visually recognized through a camera or a transparent member disposed in front of eyes of a user.

* * * * *